US012640938B1

(12) United States Patent
Shaik

(10) Patent No.: US 12,640,938 B1
(45) Date of Patent: May 26, 2026

(54) SECURING COMMUNICATION BETWEEN A PMU AND A PDC

(71) Applicant: KING FAHD UNIVERSITY OF PETROLEUM AND MINERALS, Dhahran (SA)

(72) Inventor: Muhammad Suhail Hussain Shaik, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 19/375,041

(22) Filed: Oct. 30, 2025

(51) Int. Cl.
  *H04L 9/32* (2006.01)
  *H04L 9/08* (2006.01)
  *H04L 9/30* (2006.01)

(52) U.S. Cl.
  CPC .......... *H04L 9/3268* (2013.01); *H04L 9/0825* (2013.01); *H04L 9/30* (2013.01); *H04L 9/321* (2013.01); *H04L 9/3247* (2013.01)

(58) Field of Classification Search
  None
  See application file for complete search history.

(56) References Cited

U.S. PATENT DOCUMENTS 9,106,413 B2 * 8/2015 Kim ........................... H04L 9/32
10,284,373 B2 5/2019 Faruque et al.
(Continued)

FOREIGN PATENT DOCUMENTS

CN 114915456 A 8/2022
CN 116248257 A * 6/2023 ........... H04L 9/0863

OTHER PUBLICATIONS

Shaik Mullapathi Farooq, et al., "Certificate Based Authentication Mechanism for PMU Communication Networks Based on IEC 61850-90-5", Electronics 2018, vol. 7, Issue 12, 370, 13 Pages.
(Continued)

*Primary Examiner* — Trang T Doan
(74) *Attorney, Agent, or Firm* — Oblon, McClelland, Maier & Neustadt, L.L.P.

(57)  ABSTRACT

A method and system for securing communication between a Phasor Measurement Unit (PMU) and a Phasor Data Concentrator (PDC) in accordance with IEEE C37.118.2-2024. The method includes receiving, at the PMU, a command frame requesting an authentication certificate, receiving a configuration frame comprising an X.509 certificate of the PDC, generating a public-private key pair, and transmitting a configuration frame comprising an X.509 certificate of the PMU. Mutual authentication is performed by verifying received certificates using a trusted Certificate Authority. Upon successful authentication, the PMU transmits synchrophasor data messages formatted per IEEE C37.118.2-2024, each appended with a security algorithm field and a FALCON-512 digital signature generated over defined message fields. The PDC verifies signatures using the PMU's public key and authenticates messages only upon successful verification. Replay protection is achieved through SOC timestamp comparison, rendering quantum-resistant, authenticated, and integrity-protected synchrophasor communication without altering the original IEEE C37.118.2 frame structure.

20 Claims, 18 Drawing Sheets

(56)               References Cited

U.S. PATENT DOCUMENTS

2012/0266209 A1 * 10/2012 Gooding ................. H04L 63/20
                                                  726/1
2015/0281278 A1 * 10/2015 Gooding ................. H04L 63/20
                                                  726/1

OTHER PUBLICATIONS

"VCL-PDC, Phasor Data Concentrator", Valiant Communications, https://www/valaintcom.com/pmu/pdc/phasor-data-concentrator. html, 3 Pages.

* cited by examiner

400

402

404

PMU

PDC

406

CMD Frame: Send Capability

Configuration Frame (CFG-1)

408

410

CMD Frame: Send Stream Config

Configuration Frame (CFG-3)

412

414

CMD Frame: Turn on Synchrophasor

Start

416

Synchrophasor Data

418

CMD Frame: Turn off Synchrophasor

Stop

500

| Initial Access | Execution | Persistence | Privilege Escalation | Evasion | Discovery |
|---|---|---|---|---|---|
| Driven-by Compromise | Change Operating Mode | Modify Program | Exploitation for Privilege Escalation | Change Operating Mode | Network Connection Enumeration |
| Exploit Public Facing Application | Command Line Interface | Module Firmware | Hooking | Exploitation for Evasion | Network Sniffing |
| Exploitation of Remote Services | Execution through API | Project File Infection | | Indicator Removal on Host | Remote System Discovery |
| External Remote Services | Graphical User Interface | System Firmware | | Masquerading | Remote System Information Discovery |
| Internet Accessible Services | Hooking | Valid Accounts | | Rootkit | |
| Remote Services | Modify Controller Tasking | | | Spoof Reporting Message | Wireless Sniffing |
| Replication through Removable Media | Native API | | | | |
| Rogue Master | Scripting | | | | |
| Spearphising Attachment | User Execution | | | | |
| Supply Chain Compromise | | | | | |
| Transient Cyber Asset | | | | | |
| Wireless Compromise | | | | | |

| Lateral Movement | Collection | Command and Control | Inhibit Response Function | Impair Process Control | Impact |
|---|---|---|---|---|---|
| Default Credentials | Adversary in the middle | Common used Port | Activate Firmware Update Mode | Brute Force I/O | Damage to Property |
| Exploitation of Remote Services | Automated Collection | Connection Proxy | Alarm Suspension | Modify Parameter | Denial of Control |
| Hardcoded Credentials | Data from Information Repositories | Standard Application Layer Protocol | Block Command Message | Module Firmware | Denial of View |
| Lateral Tool Transfer | Data from Local System | | Block Reporting Message | Spoof Reporting Message | Loss of Availability |
| Program Download | Detect Operating Mode | | Block Serial CDM | Unauthorized Command Message | Loss of Productivity and Revenue |
| Remote Services | I/O Image | | Change Credential | | Loss of Protection |
| Valid Accounts | Monitor Process State | | Data Destruction | | Loss of Safety |
| | Point & Tag Identification | | Denial of Service | | Loss of View |
| | Program Upload | | Device Restart/ Shutdown | | Manipulation of Control |
| | Screen Capture | | Manipulate I/O Image | | Manipulation of View |
| | Wireless Sniffing | | Modify Alarm Settings | | Theft of Operational Information |
| | | | Rootkit | | |
| | | | Service Stop | | |
| | | | System Firmware | | |

Figure 10:
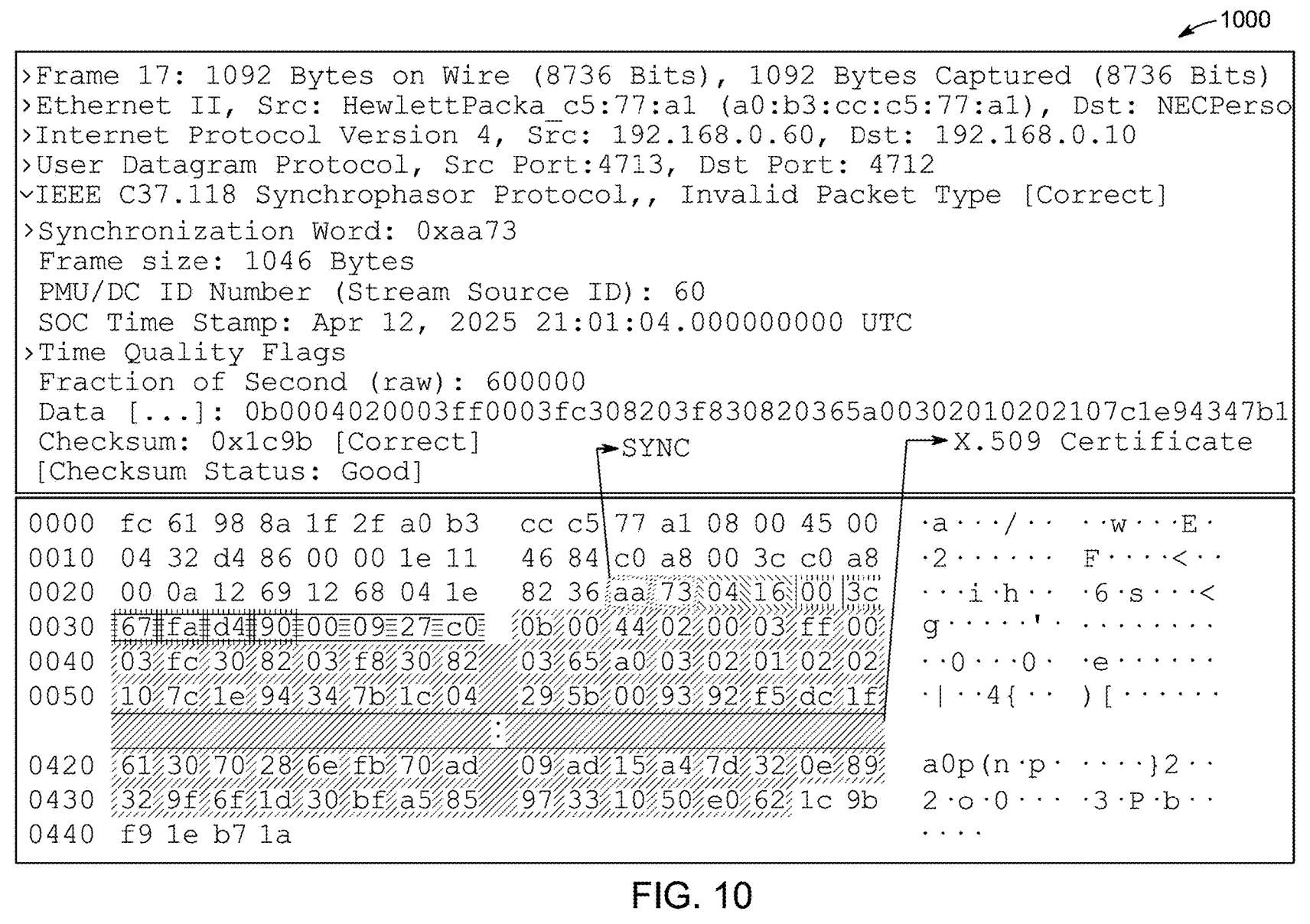

>Frame 17: 1092 Bytes on Wire (8736 Bits), 1092 Bytes Captured (8736 Bits)
>Ethernet II, Src: HewlettPacka_c5:77:a1 (a0:b3:cc:c5:77:a1), Dst: NECPerso
>Internet Protocol Version 4, Src: 192.168.0.60, Dst: 192.168.0.10
>User Datagram Protocol, Src Port:4713, Dst Port: 4712
˅IEEE C37.118 Synchrophasor Protocol,, Invalid Packet Type [Correct]

>Synchronization Word: 0xaa73
 Frame size: 1046 Bytes
 PMU/DC ID Number (Stream Source ID): 60
 SOC Time Stamp: Apr 12, 2025 21:01:04.000000000 UTC
>Time Quality Flags
 Fraction of Second (raw): 600000
 Data [...]: 0b00040200003ff0003fc308203f8308203203365a003020102021071c1e94347b1
 Checksum: 0x1c9b [Correct]
 [Checksum Status: Good]

X.509 Certificate

SYNC

| 0000 | fc 61 98 8a 1f 2f a0 b3 | cc c5 77 a1 08 00 45 00 | ·a···/·· ··w···E· |
| 0010 | 04 32 d4 86 00 00 1e 11 | 46 84 c0 a8 00 3c c0 a8 | ·2······ F····<·· |
| 0020 | 00 0a 12 69 12 68 04 1e | 82 36 aa 73 04 16 00 3c | ···i·h·· ·6·s···< |
| 0030 | 67 fa d4 90 00 09 27 c0 | 0b 00 44 02 00 03 ff 00 | g······· ··D····· |
| 0040 | 03 fc 30 82 03 f8 30 82 | 03 65 a0 03 02 01 02 02 | ··0···0· ·e·0···· |
| 0050 | 10 7c 1e 94 34 7b 1c 04 | 29 5b 00 93 92 f5 dc 1f | ·|··4{·· )[······ |
| : | : | : |
| 0420 | 61 30 70 28 6e fb 70 ad | 09 ad 15 a4 7d 32 0e 89 | a0p(n·p· ·}2···· |
| 0430 | 32 9f 6f 1d 30 bf a5 85 | 97 33 10 50 e0 62 1c 9b | 2·o·0··· ·3·P·b·· |
| 0440 | f9 1e b7 1a | | ···· |

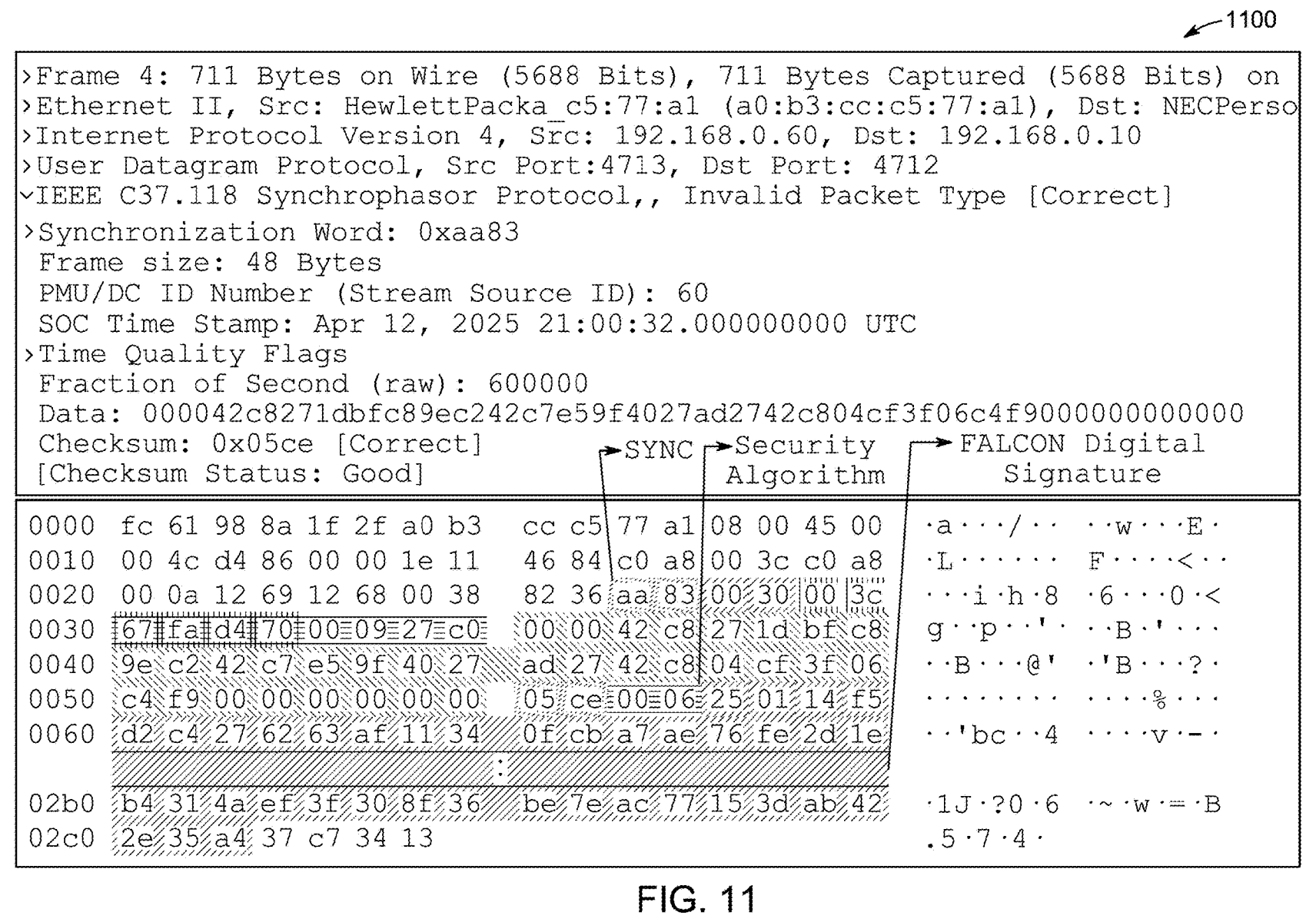

> Frame 4: 711 Bytes on Wire (5688 Bits), 711 Bytes Captured (5688 Bits) on
> Ethernet II, Src: HewlettPacka_c5:77:a1 (a0:b3:cc:c5:77:a1), Dst: NECPerso
> Internet Protocol Version 4, Src: 192.168.0.60, Dst: 192.168.0.10
> User Datagram Protocol, Src Port:4713, Dst Port: 4712
> IEEE C37.118 Synchrophasor Protocol,, Invalid Packet Type [Correct]

> Synchronization Word: 0xaa83
  Frame size: 48 Bytes
  PMU/DC ID Number (Stream Source ID): 60
  SOC Time Stamp: Apr 12, 2025 21:00:32.000000000 UTC
> Time Quality Flags
  Fraction of Second (raw): 600000
  Data: 000042c8271dbfc89ec242c7e59f4027ad2742c804cf3f06c4f9000000000000
  Checksum: 0x05ce [Correct]
  [Checksum Status: Good]

| | | | | | | | | | |
|---|---|---|---|---|---|---|---|---|---|
| 0000 | fc 61 98 8a | 1f 2f a0 b3 | cc c5 77 a1 | 08 00 45 00 | ·a···/· ·w···E· |
| 0010 | 00 4c d4 86 | 00 00 1e 11 | 46 84 c0 a8 | 00 3c c0 a8 | ·L···· F··<·· |
| 0020 | 00 0a 12 69 | 12 68 00 38 | 82 36 aa 83 | 00 30 00 3c | ···i·h·8 ·6··0·< |
| 0030 | 67 fa d4 70 | 00 09 27 c0 | 00 00 42 c8 | 27 1d bf c8 | g···p···· ·B··'·· |
| 0040 | 9e c2 42 c7 | e5 9f 40 27 | ad 27 42 c8 | 04 cf 3f 06 | ··B···@' ·'B··?· |
| 0050 | c4 f9 00 00 | 00 00 00 00 | 05 ce 00 06 | 25 01 14 f5 | ········ ··%· |
| 0060 | d2 c4 27 62 | 63 af 11 34 | 0f cb a7 ae | 76 fe 2d 1e | ··'bc··4 ····v·−· |
| : | | | | | |
| 02b0 | b4 31 4a ef | 3f 30 8f 36 | be 7e ac 77 | 15 3d ab 42 | ·1J·?0·6 ·~·w·=·B |
| 02c0 | 2e 35 a4 37 | c7 34 13 | | | ·5·7·4· |

SYNC → Security Algorithm → FALCON Digital Signature

FIG. 11

SECURING COMMUNICATION BETWEEN A PMU AND A PDC

BACKGROUND

Technical Field

The present disclosure relates generally to electric power system communications, and more particularly, to secure data transfer of synchronized phasor measurements in a wide-area network for monitoring, protection, and control of electric power systems.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Electric power systems increasingly employ synchronized phasor measurements for wide-area situational awareness, automated control, and protection functions. A phasor measurement unit generates time-aligned measurements of electrical quantities such as voltage magnitude, current magnitude, and phase angle, each referenced to a common time source such as Coordinated Universal Time derived from a global positioning system receiver. These time-synchronized measurements are streamed in real time to phasor data concentrators and control centers across communication infrastructures that may include substation networks, utility wide-area networks, and public Internet segments. IEEE C37.118.2 has become the de facto application-layer standard for this data transfer and defines message frames that include data, configuration, header, and command types to support reliable, real-time exchange.

In a representative deployment, dozens to hundreds of phasor measurement units at geographically dispersed substations transmit data frames at high reporting rates to one or more phasor data concentrators. The concentrators align and aggregate streams from multiple sources for consumption by state estimators, oscillation monitors, remedial action schemes, and operator visualization tools in control centers. Because such streams can traverse untrusted or shared networks, they are exposed to threats that include eavesdropping, packet injection, and manipulation. Compromised or spoofed measurements can misguide algorithms and human operators, leading to incorrect automated actions or delayed operator response. Historical disturbances have demonstrated that bad or delayed data can contribute to cascading events, underscoring the importance of message authenticity and integrity in maintaining grid stability. Despite the criticality of trustworthy data, the latest revision of the standard, IEEE C37.118.2-2024, does not specify integrated security mechanisms to authenticate sources or verify message integrity within the application protocol. In practice, utilities commonly encapsulate phasor measurement unit traffic using virtual private networks or employ Internet Protocol layer security such as IPsec to provide confidentiality and integrity over routed links. While these measures improve confidentiality and link protection, they introduce additional processing and may not be optimized for the stringent latency and jitter requirements of synchrophasor applications. Moreover, because such protections are typically applied between edge routers or gateways, they do not furnish application-layer end-to-end authentication and integrity for individual phasor messages, leaving exposures to insider or intra-domain attacks where traffic can be altered within network boundaries.

Research addressing cyberattacks on IEEE C37.118.2 communications generally falls into two categories. A first category concentrates on attack detection and mitigation using redundant data and data-driven analytics. Representative efforts include false data injection detection methodologies, intrusion detection systems, anomaly detection frameworks, and techniques that target the identification of manipulated synchrophasor streams. These approaches can raise alerts or filter suspect data but operate after transmission and depend on models, thresholds, or cross-validation, which may not prevent acceptance of forged messages that appear plausible. A second category focuses on strengthening the communication protocol itself to resist attacks by introducing cryptographic assurances that bind each message to a legitimate origin and detect any modification.

Within the second category, prior efforts at the application layer have relied on symmetric cryptography with shared secrets. One known scheme employs a key distribution center to deliver group or pairwise keys used for encryption with advanced encryption standard and for message authentication using codes such as HMAC or GMAC. Symmetric verification can be performed in microseconds and is attractive for real-time processing. However, distribution and lifecycle management of secret keys for a large and evolving fleet of phasor measurement units and phasor data concentrators require additional secure infrastructure, such as a group domain of interpretation key server. If a pre-shared key, device, or the key distribution center is compromised, an adversary can forge valid authentication tags. This creates a shared fate, in which compromise of one element undermines communications for many.

Asymmetric digital signatures alleviate certain scalability issues of secret sharing by enabling public verification. Classical algorithms in broad deployment, such as RSA and elliptic curve digital signature algorithm, rely on hardness assumptions related to integer factorization and discrete logarithms. Advances in quantum computing, including algorithms such as Shor and Grover, threaten to render these assumptions insufficient, thereby weakening or invalidating the assurances provided by such signatures for critical infrastructure that must remain secure over long horizons. The prospect of quantum-capable adversaries has accelerated the development of post-quantum cryptographic alternatives designed to remain secure in the presence of quantum attacks.

Post-quantum cryptography provides signature families that include lattice-based schemes and hash-based constructions. Candidates such as lattice-based FALCON and CRYSTALS-Dilithium and the hash-based SPHINCS+ have been studied extensively. In particular, parameters commonly referred to as FALCON-512 are recognized for highly compact signatures and efficient verification relative to alternatives, characteristics that are attractive for bandwidth-constrained and delay-sensitive synchrophasor communications. Parallel lines of work have explored hardware-based provenance using physically unclonable functions informed by quantum mechanical effects to produce quantum-secure authentication tags of fixed length such as 256 bits for IEEE C37.118.2 messages. While promising, such approaches require specialized hardware integration into existing phasor measurement units, can impose operational complexity, and face compatibility and interoperability constraints across diverse, already deployed equipment, creating barriers to wide-scale adoption.

Security enhancements for IEEE C37.118.2 must also respect protocol engineering constraints. The 2024 revision, identified in industry practice as version 3, defines frame formats with required fields that ensure interoperability. Any application-layer security mechanism intended for broad deployment should maintain backward compatibility by avoiding changes to required fields while providing a means to bind a digital signature or authentication artifact to each message in a way that is processable by compliant receivers. Because digital signatures increase computation and message size, design choices must consider end-to-end delay and loss characteristics across different communication technologies used in synchrophasor deployments. Practical evaluation requires software capable of generating and processing secured IEEE C37.118.2 messages and test environments that emulate realistic network conditions to assess latency and throughput impacts against real-time constraints.

Accordingly, there exists a need for an application-layer, end-to-end security framework tailored to IEEE C37.118.2 that authenticates the origin of each message and verifies its integrity without imposing excessive delay or bandwidth overhead. Such a framework should avoid reliance on shared secret distribution at large scale, remain robust in the presence of potential quantum adversaries, and minimize operational disruption by integrating with existing frame formats of IEEE C37.118.2-2024. Confidentiality of phasor streams may be treated as secondary where it would otherwise introduce undue complexity or latency, while primary emphasis is placed on strong node authentication and per-frame integrity verification. Solutions that meet these criteria and are realizable using software on existing devices, while accommodating evaluation across representative communication technologies to demonstrate adherence to real-time synchrophasor requirements, would address longstanding deficiencies in securing wide-area measurement communications.

SUMMARY

In one exemplary embodiment, a method for securing communication between a Phasor Measurement Unit (PMU) and a Phasor Data Concentrator (PDC) in accordance with IEEE C37.118.2-2024 is disclosed. The method comprises receiving, at the PMU, a command frame from the PDC requesting authentication, receiving, at the PMU, a configuration frame comprising an X.509 certificate issued by a Certificate Authority (CA), the X.509 certificate including a public key of the PDC, verifying, at the PMU, the authenticity of the X.509 certificate received from the PDC using a trusted CA, generating, at the PMU, a public-private key pair of the PMU, the public-private key pair comprising a public key of the PMU and a private key of the PMU, transmitting, from the PMU to the PDC, a configuration frame comprising an X.509 certificate issued by the trusted CA, the X.509 certificate including the public key of the PMU, verifying, at the PDC, the authenticity of the X.509 certificate received from the PMU using the trusted CA, and transmitting, from the PMU to the PDC, synchrophasor data messages digitally signed using the private key of the PMU, upon successful mutual authentication.

In another exemplary embodiment, a system for secure transmission of synchrophasor data is disclosed. The system comprises a PMU configured to generate a public-private key pair, receive a configuration frame including a X.509 certificate from a PDC, verify the certificate via a CA, transmit a X.509 certificate from the PMU, and transmit digitally signed synchrophasor messages, and a PDC configured to send a command frame requesting the X.509 certificate from the PDC, transmit a X.509 certificate from the PDC, receive the X.509 certificate from the PMU, verify the received PMU certificate via the CA, and authenticate signed messages using the public key from the PMU.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 5 is an illustration of a MITRE ATT&CK ICS matrix applied to R-GOOSE and R-SV threat and vulnerability assessment in IEEE C37.118.2 communications, according to certain embodiments;

FIG. 10 is an illustration of a Wireshark capture of a CFG-4 message transmitted by a PMU containing its X.509 certificate, according to certain embodiments;

FIG. 11 is an illustration of a Wireshark capture of a FALCON-secured IEEE C37.118.2 data message, according to certain embodiments;

DETAILED DESCRIPTION

Figure 1:
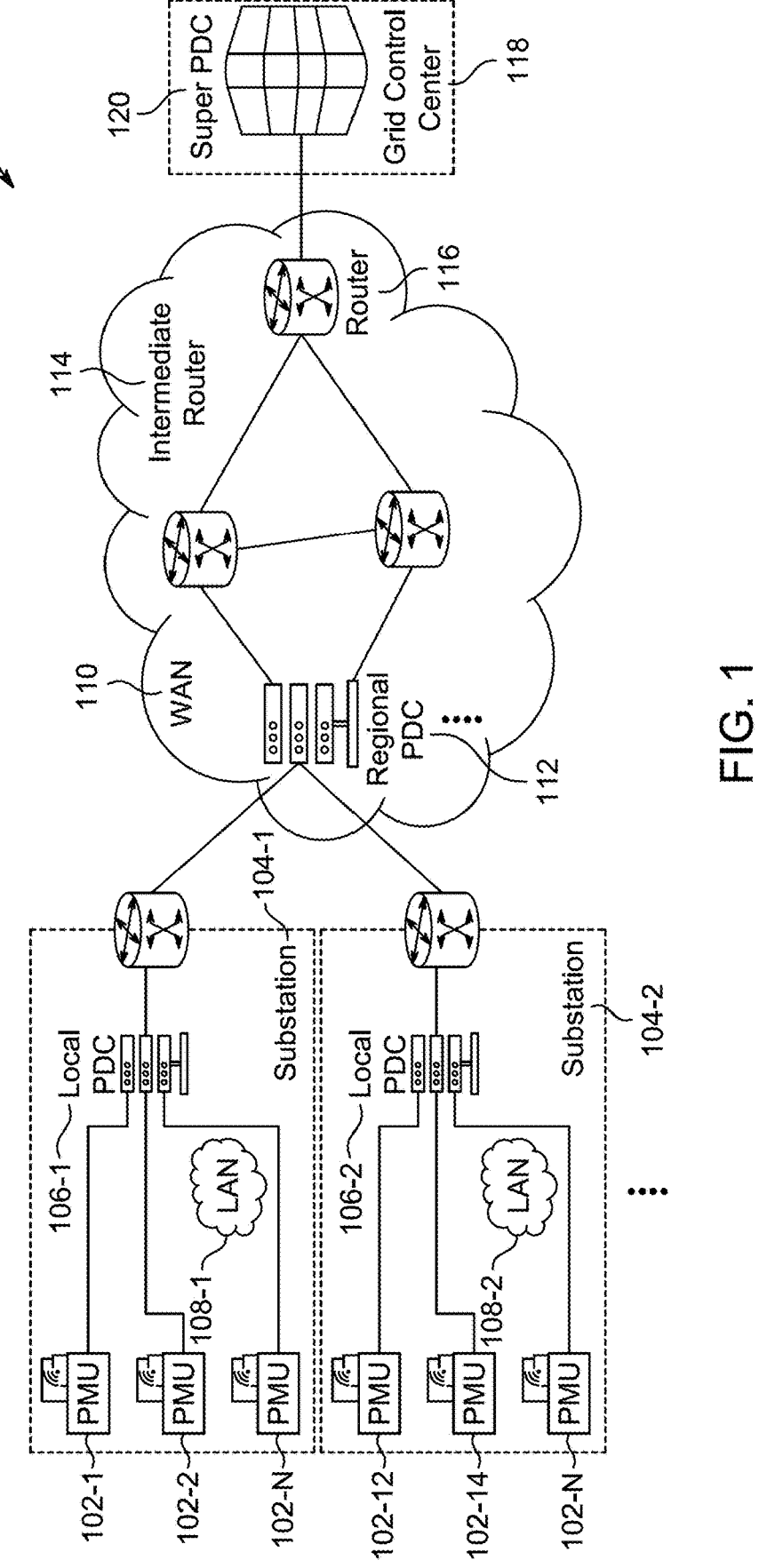
FIG. 1 is an illustration of a PMU-communication network, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

The present disclosure addresses the absence of intrinsic cybersecurity mechanisms in the IEEE C37.118.2 standard, which is extensively used for synchrophasor data communications between Phasor Measurement Units (PMUs) and Phasor Data Concentrators (PDCs). While the standard provides a robust framework for real-time measurement and control, its lack of built-in security leaves synchrophasor communication networks susceptible to a range of cyber threats, including data spoofing, manipulation, replay attacks, and emerging quantum computing-based attacks capable of undermining classical cryptographic algorithms. Such vulnerabilities pose significant risks to the stability and reliability of power system monitoring and control operations.

To overcome these deficiencies, the disclosure provides a quantum-resistant security framework that integrates the FALCON-512 lattice-based digital signature scheme into IEEE C37.118.2 messages in a backward-compatible manner. The framework incorporates public key infrastructure (PKI) using X.509 certificates for mutual authentication between PMUs and PDCs, replay attack mitigation through second-of-century (SOC) timestamp validation, and per-frame message authentication and integrity verification via FALCON-512 digital signatures. Implementation is realized through the developed "S-PMU-Falcon" software framework, enabling secure initialization, certificate exchange, and signature generation/verification without altering defined IEEE C37.118.2 fields. Experimental evaluation, including deployment on resource-constrained devices and realistic wide-area network emulation, demonstrates that the proposed scheme introduces minimal computational and communication overhead, remaining well within the stringent latency bounds of real-time PMU applications. This solution effectively enhances IEEE C37.118.2 communications against both current and future quantum-enabled cyber threats.

FIG. 1 illustrates a PMU-communication network 100 configured to transport synchronized phasor measurements in accordance with IEEE C37.118.2 across substation, regional, and control-center domains.

A phasor measurement unit (PMU) is a device configured to measure electrical quantities in a power system and to compute synchrophasor data. A PMU may receive analog voltages and current waveforms from a power grid and computes corresponding phasors, which represent the magnitude and phase angle of the waveforms. The phasor values are typically time-synchronized using a high-precision clock signal, such as that derived from the Global Positioning System (GPS). The time-synchronized nature of the measurements allows phasor data from geographically distributed PMUs to be directly compared and aggregated. PMUs generally transmit such synchrophasor measurements to a phasor data concentrator (PDC) using a communication protocol defined, for example, in IEEE Standard C37.118.2-2024.

Synchrophasor measurements represent the magnitude and phase angle of alternating current (AC) voltage and current waveforms at a given location in a power system. Each measurement is time-stamped using a common reference, such as GPS, to ensure synchronization across geographically distributed PMUs. The time-synchronized nature of these measurements allows the PDC to accurately compare and aggregate phasor data from multiple PMUs, enabling real-time monitoring, control, and fault detection across the electrical grid. Since synchrophasor data is used for critical operational decisions, ensuring the authenticity and integrity of these synchrophasor measurements is essential for maintaining the power system.

The PDC is a computing device configured to receive synchrophasor measurements from one or more PMUs. The PDC collects, time-aligns, and aggregates the received synchrophasor data to create a unified view of system conditions across multiple measurement points in the power grid. A PDC may further perform data quality checks, discard invalid or delayed measurements, and forward aggregated phasor data streams to higher-level applications, such as wide-area monitoring systems or energy management systems. Communication between a PMU and a PDC is specified in IEEE Standard C37.118.2-2024, which defines frame structures for command, configuration, and data messages exchanged between these entities. In some cases, data from several PDCs are sent to a central data handling unit, also known as a super PDC.

A plurality of Phasor Measurement Units denoted as PMUs 102-1, 102-2, and 102-N reside within a first substation 104-1. Each PMU generates time-synchronized electrical phasors comprising voltage magnitude, current magnitude, and phase angle referenced to a common time source such as GPS-based Coordinated Universal Time. The PMUs 102-1, 102-2, and 102-N interface to a Local Area Network 108-1 that provides intra-substation connectivity and forwards synchrophasor messages to a local Phasor Data Concentrator (PDC) 106-1. The local Phasor Data Concentrator 106-1 is configured to receive data streams from the plurality of PMUs within the substation 104-1, perform local alignment with respect to the time stamps carried in the received frames, and output an aggregated stream toward upstream network elements.

A further plurality of PMUs, exemplified by PMUs 102-12 and 102-14 and extensible through 102-N, operate within a second substation 104-2. These devices connect over a Local Area Network (LAN) 108-2 to a local Phasor Data Concentrator 106-2. The Local Area Network 108-2 provides the same functional role as the Local Area Network 108-1 but for the second substation 104-2. The local Phasor Data Concentrator 106-2 aggregates and time-aligns the PMU 102 outputs of the second site and forwards the resulting stream toward the wide-area domain.

Each substation employs a gateway router that couples the respective local Phasor Data Concentrator to a Wide-Area Network (WAN) 110. The Wide-Area Network 110 interconnects geographically distributed substations with regional aggregation infrastructure. Within the Wide-Area Network 110, a Regional Phasor Data Concentrator 112 is configured to receive aggregated streams from multiple substations, perform regional-level alignment and consolidation across the contributing sources, and make the consolidated stream available to downstream consumers. Routing within the Wide-Area Network 110 is provided by an Intermediate Router 114 and a Router 116 that establish multiple routed paths and enable resilient, multi-hop forwarding between the substations, the Regional Phasor Data Concentrator 112, and a centralized control-center domain.

At the control-center side, a Super Phasor Data Concentrator 120 located within a grid control center 118 ingests the consolidated regional streams. The Super Phasor Data Concentrator 120 is operable to perform wide-area alignment and consolidation across regions so that situational awareness, protection logic, and coordinated control actions can be executed with a unified, time-coherent view of the grid state. The grid control center 118 thus constitutes the supervisory endpoint for the hierarchy of Phasor Data Concentrators illustrated in the PMU-communication network 100.

The PMU-communication network 100 carries IEEE C37.118.2 messages that traverse from the PMUs to the local Phasor Data Concentrators, onward to the Regional Phasor Data Concentrator 112 through the Wide-Area Network 110, and finally to the Super Phasor Data Concentrator 120 at the grid control center 118. IEEE C37.118.2 defines message categories that include data, configuration, header, and command, and the latest IEEE Std C37.118.2-2024 version introduces additional categories and optional features such as event-triggered data reporting and historical data retrieval while streamlining configuration frame types for simplified implementation. All synchrophasor messages in IEEE C37.118.2-2024 share a common frame structure and set of fields that are transported transparently over the network paths depicted in FIG. 1. Each frame begins with a 2-byte synchronization word denoted as SYNC, followed by a 2-byte frame length word denoted as FRAMESIZE, a 2-byte stream identification code denoted as IDCODE, an 8-byte time stamp, message-specific data fields, and a 2-byte cyclic redundancy check denoted as CRC. The 8-byte time stamp comprises a 4-byte SOC value representing seconds-of-century and a 4-byte fractional second component. The fractional second component is further partitioned into a 1-byte leap-second indicator denoted as LEAP_BYTE and a 3-byte fraction-of-second value denoted as FRACSEC. The SYNC field provides frame synchronization and identification such that receivers can recognize the start of a new frame and determine its type and version immediately. The first byte of SYNC is the constant 0xAA, and the second byte of SYNC contains a 4-bit frame type code and a 4-bit version number. These defined parameters are preserved end-to-end as the frames traverse the Local Area Networks 108-1 and 108-2, the Wide-Area Network 110, and various Phasor Data Concentrators 106-1, 106-2, 112, and 120.

FIG. 1 thus accommodates deployments in which the communications between substations, the Regional Phasor Data Concentrator 112, and the grid control center 118 are carried over utility Wide-Area Networks or public Internet infrastructure. In such deployments, traffic may be encapsulated within virtual private networks or protected at the Internet Protocol layer using IPsec to provide confidentiality and integrity on routed links. Because these protections are typically applied between edge routers, the application-layer per-frame semantics of IEEE C37.118.2 remain unchanged, and frames are delivered to the Phasor Data Concentrators with their SYNC, FRAMESIZE, IDCODE, SOC, LEAP_BYTE, FRACSEC, and CRC fields intact for time alignment, aggregation, and supervisory processing across the hierarchical PMU-communication network 100

Figure 2:
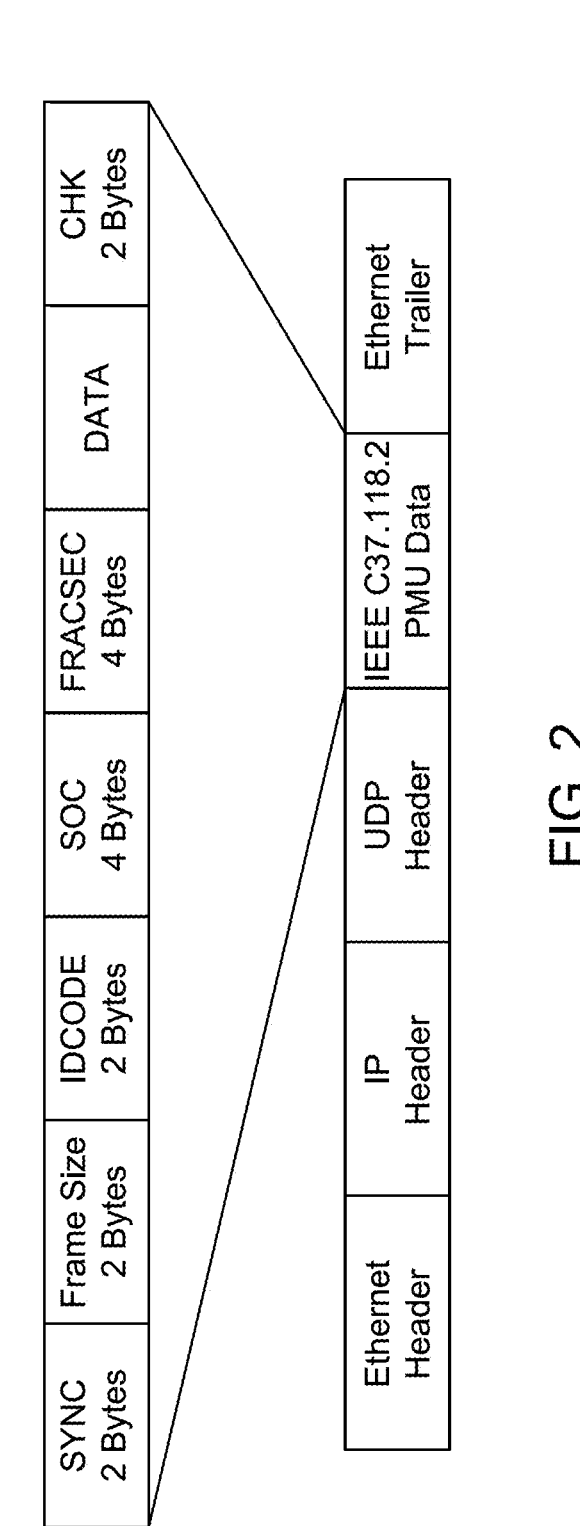
FIG. 2 is an illustration of the structure of a typical IEEE C37.118.2 frame, according to certain embodiments.

FIG. 2 illustrates a structure of a typical IEEE C37.118.2 frame 200 configured to convey synchrophasor messages in accordance with IEEE Std C37.118.2-2024. The latest revision introduces new message categories and optional features including event-triggered data reporting and historical data retrieval and streamlines the configuration frame types to simplify implementation. Notwithstanding such categories and options, all synchrophasor messages share a common frame structure and set of fields as depicted by the frame 200.

The frame 200 begins with a synchronization word denoted as SYNC having a length of 2 bytes. The SYNC field provides frame synchronization and identification so that a receiver can recognize the start of a new frame and determine its type and version immediately. The first byte of SYNC is the constant 0xAA, and the second byte of SYNC contains a 4-bit frame type code and a 4-bit version number. Following the SYNC field is a frame length word denoted as FRAMESIZE with a length of 2 bytes, which specifies the total frame length in bytes from the SYNC field through the trailing check field.

The frame 200 further includes a stream identification code denoted as IDCODE with a length of 2 bytes that uniquely identifies the source stream associated with the message. The time stamp occupies 8 bytes and is partitioned into a 4-byte SOC value representing seconds-of-century and a 4-byte fractional second component. The fractional second component is further divided into a 1-byte leap-second indicator denoted as LEAP_BYTE and a 3-byte fraction-of-second value denoted as FRACSEC. Message-specific data fields follow the time stamp and together constitute the DATA portion of the frame 200. The frame concludes with a 2-byte cyclic redundancy check denoted as CRC, shown in the figure as CHK 2 Bytes, which allows receivers to verify frame integrity.

The lower portion of FIG. 2 depicts a representative encapsulation context in which the IEEE C37.118.2 PMU Data appears as payload within a transport stack comprising an Ethernet header, an Internet Protocol header, and a User Datagram Protocol header, and is followed by an Ethernet trailer. In such encapsulations, the SYNC, FRAMESIZE, IDCODE, SOC, LEAP_BYTE, FRACSEC, DATA, and CRC fields of the frame 200 are transparently carried between communicating endpoints while the Ethernet, IP, and UDP headers and the Ethernet trailer provide link and network transport services external to the application-layer frame definition.

Figure 3:
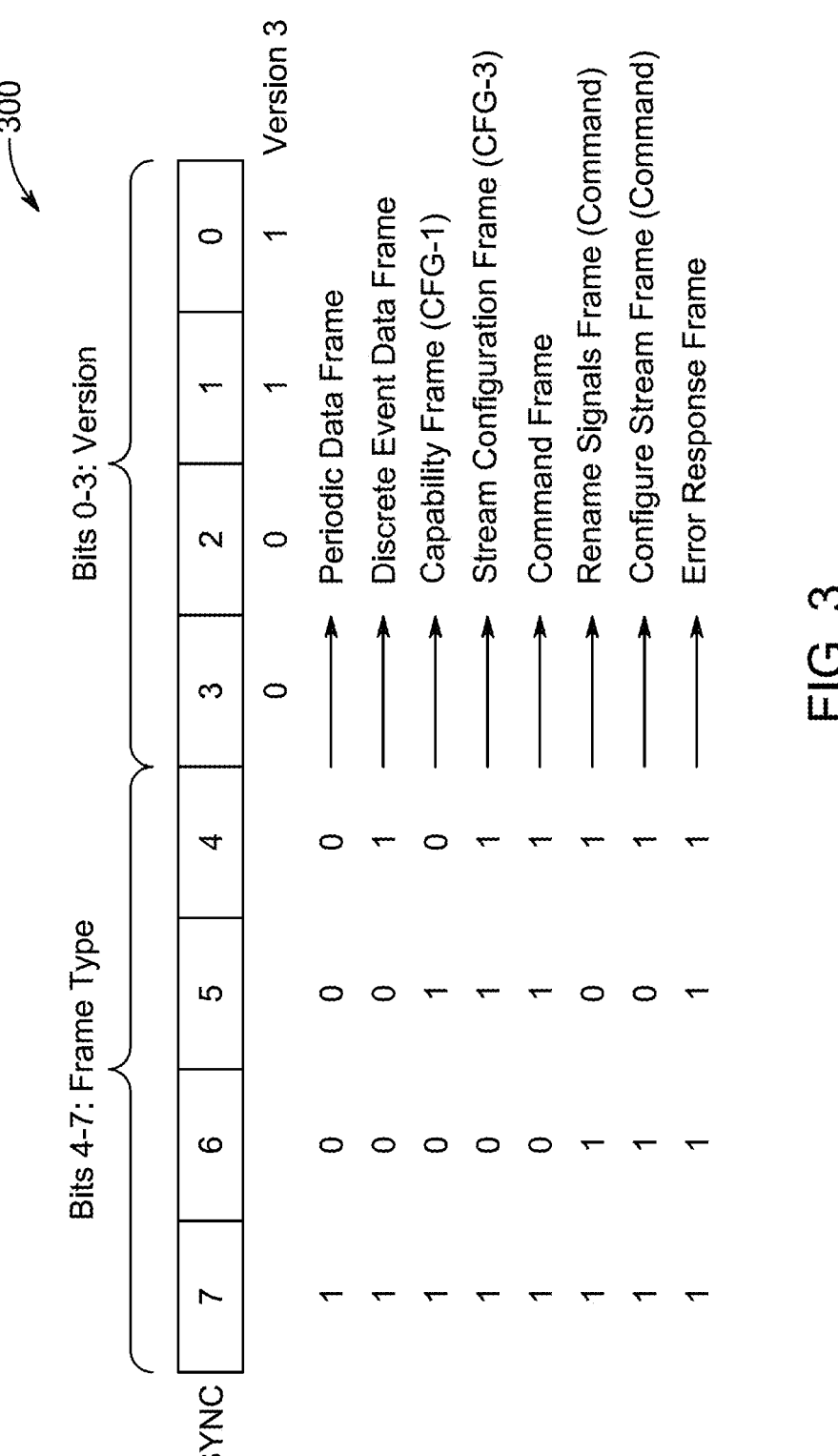
FIG. 3 is an illustration of the definition of the second byte within the IEEE C37.118.2 SYNC field, according to certain embodiments.

FIG. 3 illustrates a definition of the second byte within the SYNC field 300 of an IEEE C37.118.2 frame, showing the bit-level partitioning that identifies the message category and the protocol version used by the transmitter. The SYNC field comprises two bytes; the first byte is the constant 0xAA, and the second byte is divided into two four-bit nibbles. Bits 4 through 7 constitute a frame-type nibble that encodes the category of the message being transported. Bits 0 through 3 constitute a version nibble that encodes the protocol version. In the depiction of FIG. 3, the version nibble is set to 0 0 1 1, which corresponds to Version 3.

The frame-type nibble in FIG. 3 enumerates the message categories adopted in IEEE Std C37.118.2-2024. Data frames carry the primary synchrophasor measurements from PMUs or PDCs in real time and, in this revision, are defined in two sub-types. A periodic data frame is the standard streaming message emitted at a regular reporting rate and contains the instantaneous phasor measurements together with frequency, ROCOF, and digital or analog status values from one or more PMUs. A discrete event data frame is a new frame type introduced in the 2024 revision to report asynchronous binary events efficiently; rather than transmitting the full set of phasors and analog values, an event data frame conveys only digital status data from the PMU or PMUs and is intended to be sent when a binary input changes state or when an event trigger occurs.

The frame-type nibble further identifies configuration messages and command messages. Configuration frames convey meta-information that describes the format and contents of the PMU measurements so that receivers can correctly interpret subsequent data frames. Two configuration messages are defined and mandated in IEEE C37.118.2-2024. A CFG-1 capability frame is a fixed-format message that enumerates the measurement capabilities of the sending device. A CFG-3 stream configuration frame is a variable-length and extensible message that describes the currently active configuration of the data stream and can carry additional metadata to support flexible interpretation at the receiver.

Command messages are transmitted from a controlling device, typically a PDC or other client, to a data source, which may be a PMU or a PDC, to manage the stream and request information. Each command frame carries a sixteen-bit CMD field that encodes the specific command to be executed. The principal CMD field values specified in IEEE C37.118.2-2024, which are to be interpreted exactly as written, are as follows: 0000 0000 0001 0000 Turn Off Data frames; 0000 0000 0010 0000 Turn On Data frames; 0000 0000 0011 0000 Reserved; 0000 0000 0100 0000 Send Capability CFG-1; 0000 0000 0101 0000 Reserved; 0000 0000 0110 0000 Send Stream Configuration CFG-3; 0000 0000 1000 0000 Signifies an Old Data Request; 0000 1111 xxxx xxxx User-Defined Commands, which allow users to define proprietary commands; 1111 xxxx xxxx xxxx Reserved. In the same second byte context, additional command-oriented frame categories recognized by the frame-type nibble include a rename signals frame command and a configure stream frame command, and an error response frame category is defined for negative acknowledgements and error reporting. Table 1 lists the main command codes (CMD field values) in IEEE C37.118.2-2024 and their meanings.

TABLE 1

CMD Field Values and Description of the Command Type

| CMD Code (16-bit) | Description |
| --- | --- |
| 0000 0000 0001 0000 | Turn Off Data frames |
| 0000 0000 0010 0000 | Turn On Data frames |
| 0000 0000 0011 0000 | Reserved |
| 0000 0000 0100 0000 | Send Capability (CFG-1) |
| 0000 0000 0101 0000 | Reserved |
| 0000 0000 0110 0000 | Send Stream Configuration (CFG-3) |
| 0000 0000 1000 0000 | Signifies an Old Data Request |
| 00001111 xxxx xxxx | User-Defined Commands-Allow users to define proprietary commands. |
| 1111 xxxx xxxx xxxx | Reserved |

Accordingly, FIG. 3 presents the second byte of SYNC as a compact discriminator in which the upper nibble, Bits 4 through 7, selects among periodic data frames, discrete event data frames, capability frames CFG-1, stream configuration frames CFG-3, command frames including rename signals and configure stream commands, and an error response frame, while the lower nibble, Bits 0 through 3, specifies the protocol version, exemplified by 0 0 1 1 for Version 3.

Figure 4:
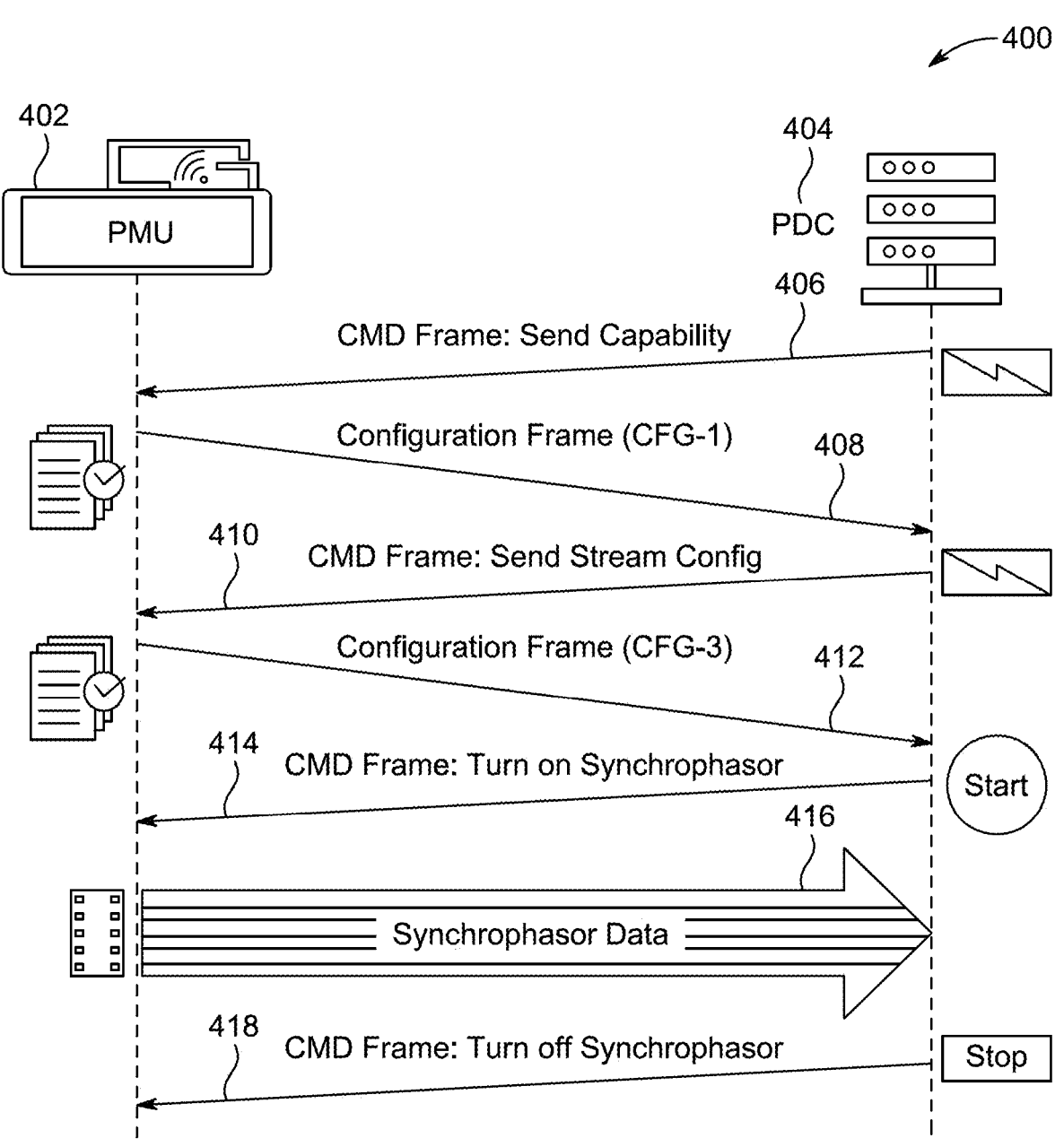
FIG. 4 is an illustration of data exchange between PMUs and PDCs following the IEEE C37.118.2 protocol, according to certain embodiments.

FIG. 4 illustrates a data exchange sequence between a Phasor Measurement Unit (PMU) 402 and a Phasor Data Concentrator (PDC) 404 that follows the IEEE C37.118.2 protocol. The sequence depicts a typical control and configuration handshake prior to and following the transmission of synchrophasor data. A controlling device, exemplified by the Phasor Data Concentrator 404, initiates the session by transmitting (e.g., sending) a command frame (also referred to herein as a 'CMD frame') indicating the capability 406 toward the Phasor Measurement Unit 402. The command frame 406 requests a capability disclosure in accordance with IEEE C37.118.2, in which the requested response is a fixed format capability frame designated as Configuration frame 408, such as a CFG-1 version. In some examples, the capability frame indicates what measurements the Phasor Measurement Unit 402 may provide to the Phasor Data Concentrator 404. In response, the Phasor Measurement Unit 402 returns the Configuration frame 408, such as a version CFG-1 that enumerates the measurement capabilities of the sending device, including the available phasor channels, analog channels, digital status channels, nominal frequency, data types, and applicable reporting rates, formatted as defined for the capability frame (e.g., CFG-1) in IEEE C37.118.2-2024.

Following the capability disclosure, the Phasor Data Concentrator 404 transmits a second CMD frame 410 containing a message instructing the Phasor Measurement Unit 402 to send stream configuration for operational use. For example, the Phasor Data Concentrator 404 may specify the measurements for the Phasor Measurement Unit 402 to report, the reporting rate, and other relevant parameters for the synchrophasor data stream. In response, the Phasor Measurement Unit 402 returns a variable length and extensible configuration message designated as Configuration frame 412, such as a CFG-3 version that specifies the presently active data stream parameters, including signal ordering, scaling, phasor and analog formats, digital word assignments, time quality flags, and other metadata required for correct interpretation of subsequent data frames, formatted as defined for the stream configuration frame (e.g., CFG-3) in IEEE C37.118.2-2024. In some cases, the configuration frame 412 may indicate its readiness to transmit according to the specified stream settings set by the Phasor Data Concentrator 404.

Upon completion of capability and configuration exchange, the Phasor Data Concentrator 404 issues a start command with a CMD frame 414 instructing the Phasor Measurement Unit 402 to commence synchrophasor data transmission. In response to the start command with the CMD frame 414, the Phasor Measurement Unit 402 transmits synchrophasor data 416 to the Phasor Data Concentrator 404. The synchrophasor data 416 consist of IEEE C37.118.2 data frames that carry time aligned measurements comprising instantaneous phasor values, frequency, rate of change of frequency, and digital or analog status values, referenced to a common time source and formatted in accordance with the earlier CFG-1 and CFG-3 information. The data frames in the synchrophasor data 416 are typically periodic data frames emitted at a regular reporting rate and are compatible with the additional event triggered reporting options introduced in the 2024 revision where applicable.

To end the reporting session, the Phasor Data Concentrator 404 transmits a stop command labeled CMD frame 418 instructing the Phasor Measurement Unit 402 to stop transmitting synchrophasor data. In other words, the Phasor Data Concentrator 404 sends the CMD frame 418 to the Phasor Measurement Unit 402 to turn off synchrophasor data 416 transmission. Upon receipt of the command frame 418, the Phasor Measurement Unit 402 ceases transmission of the synchrophasor data 416. The exchange illustrated in FIG. 4 therefore captures the normative ordering and roles of command frames and configuration frames relative to data frames in a representative IEEE C37.118.2 session between a Phasor Measurement Unit and a Phasor Data Concentrator, while preserving application layer semantics defined by the 2024 version of the standard.

FIG. 5 illustrates a MITRE ATT&CK for Industrial Control Systems matrix that is annotated for R-GOOSE and R-SV. The matrix presents the tactic columns used in the MITRE ATT&CK framework for the industrial control systems domain and situates the routable Generic Object Oriented Substation Event and routable Sampled Values communication profiles within that adversary behavior model. The figure conveys that the matrix is applied as an analytic aid for threat modeling and assessment of R-GOOSE and R-SV traffic in utility and substation networks, enabling practitioners to reason about potential adversary objectives across tactic categories and to map corresponding defensive controls.

Figure 6:
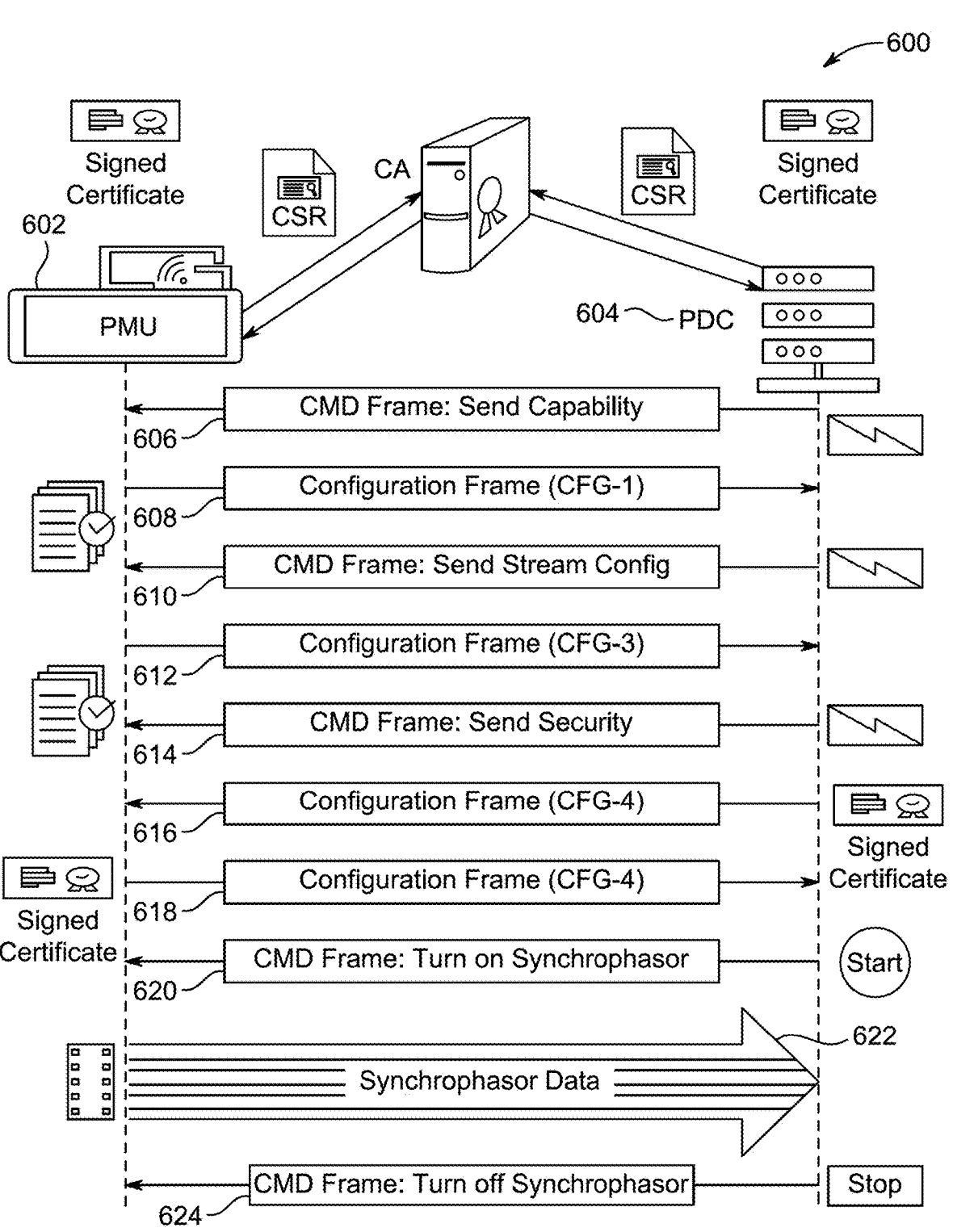
FIG. 6 is an illustration of secure IEEE C37.118.2 communication between a PMU and a PDC, according to certain embodiments.

FIG. 6 illustrates a secure IEEE C37.118.2 communication sequence 600 between a Phasor Measurement Unit 602 and a Phasor Data Concentrator 604 under a public key infrastructure anchored at a Certificate Authority (CA). The Certificate Authority issues X.509 certificates in response to certificate signing requests generated by the PMU 602 and the PDC 604. Each X.509 certificate is a standardized digital certificate that binds a public key to the respective device and is digitally signed by the Certificate Authority. The figure depicts signed certificates available to both endpoints after issuance by the Certificate Authority.

The sequence begins after completion of the configuration exchanges depicted for IEEE C37.118.2. A command frame designated as CMD frame 606 to send capability of the PMU 602 may precede and is followed by the PMU 602 sending a Configuration frame 608, such as a CFG-1 version to the PDC 604. A subsequent command designated as CMD frame 610 instructs the PMU 602 to send a stream configuration which includes the specified measurements to be reported to the PDC 604. Upon receiving the CMD frame 610, the PMU 602 sends a Configuration frame 612, such as a CFG-3 version. Upon receipt of the CFG-3 information at the PDC 604, the secure initialization commences with a command designated as CMD frame 614 indicating that the PMU 602 sends security data. The CMD frame 614 includes a CMD field set to a user-defined value indicating a certificate request, exemplified as 0000 1111 0000 0001. Subsequently to the CMD 614, the PDC 604 transmits a Configuration Frame 616, such as a CFG-4 version containing an X.509 certificate issued by the Certificate Authority, the certificate including a public key associated with the PDC 604. The PMU 602 generates a public-private key pair using lattice-based cryptographic primitives and transmits a Configuration Frame 618 (e.g., a CFG-4) containing an X.509 certificate including the PMU's public key. In one embodiment, FALCON key pair generation begins with selecting four short polynomials p, q, P, Q∈$Z_r$[x]/(∅), where ∅(x) =$x^n$+1 is a cyclotomic polynomial with n=$2^k$. These polynomials must satisfy the NTRU congruence pQ−qP=rmod∅, ensuring the resulting key pair lies within a suitable lattice. The polynomials are organized into a basis matrix $$B = \begin{bmatrix} q & -p \\ -Q & P \end{bmatrix},$$

which undergoes LDL* decomposition to construct a normalized Falcon tree. The public key is generated using the hash H=$qp^{-1}$modr, while the secret key is derived from the normalized short vectors.

The CFG-4 configuration frame employs the standard IEEE C37.118.2 frame header with SYNC, FRAMESIZE, IDCODE, and timestamp fields, and a payload field containing the X.509 certificate. For the CFG-4 frame, the SYNC second byte is set to 0x73, where the upper nibble 0x7 identifies the CFG-4 frame type and the lower nibble 0x3 indicates protocol version 3. The CFG-4 frame is used exclusively to transmit X.509 certificates and includes a sync field and a payload field.

Upon exchange of the certificates, mutual node authentication is performed. The PMU 602 verifies the authenticity of the X.509 certificate received from the PDC 604 using a trusted Certificate Authority. The PDC 604 verifies the authenticity of the X.509 certificate received from the PMU 602 using the trusted Certificate Authority. Failure to verify either X.509 certificate causes the PMU 602 or the PDC 604 to terminate a communication session. Each of the PMU 602 and the PDC 604 may store the public key and certificate of the peer in a local certificate store for reuse in future sessions, and each of the PMU 602 and the PDC 604 may renew its X.509 certificate after a defined time period. The PMU 602 and the PDC 604 thus complete mutual authentication before any secure data exchange proceeds.

In some embodiments, once the PMU 602 has verified the authenticity of the X.509 certificate of the PDC 604 and the corresponding public key, the PMU 602 and the PDC 604 may cache or otherwise locally store the validated certificate and associated public key material for reuse in subsequent communication sessions. Reusing a previously authenticated certificate and public key, the PMU 602 and the PDC 604 may avoid repeating a full certificate exchange during every new session, thereby reducing communication overhead and latency in establishing secure channels. Similarly, the PDC 604 may retain the validated certificate and public key of the PMU 602 for use in future sessions. In certain embodiments, reuse of keys and certificates may be limited to a configurable validity interval, aligned with the certificate's expiration date or a pre-defined session timeout. In further embodiments, session resumption techniques, such as re-keying based on cached credentials, may be employed to balance security and efficiency. This approach allows for secure, low-latency continuation of synchrophasor data streaming while reserving the authenticity guarantees provided by the trusted CA. In alternative embodiments, a defined time period set by a user, or a common standard may expire; therefore, the PMU 602 and the PDC 604 may renew each X.509 certificate to ensure security and the full certificate exchange process may restart.

After successful mutual authentication, the PDC 604 issues a CMD frame 620 to start (e.g., turn on) synchrophasor data transmission to initiate reporting. The PMU 602 transmits synchrophasor data 622 to the PDC 604, where each synchrophasor data message includes a message payload formatted in accordance with IEEE C37.118.2-2024 and a checksum field. In some cases, the checksum field may include a small piece of data, often a string of numbers and letters, included in a file or data packet to detect errors or tampering. Further, a security algorithm field is appended after the checksum field. The security algorithm field comprises two bytes, a first byte indicating absence of encryption and a second byte indicating the use of a digital signature algorithm. A digital signature is appended after the security algorithm field. The digital signature is generated by applying a FALCON-512 algorithm to a SHA-512 hash of message fields extending from a synchronization byte through the checksum field. The digital signature is appended after the checksum field without modifying the original IEEE C37.118.2 frame structure. The PMU 602 is therefore configured to generate digitally signed synchrophasor messages using a FALCON-512 algorithm. In one embodiment, to sign the message, the PMU 602 computes a hash polynomial d from the message concatenated with a randomly generated salt s∈$\{0,1\}^{320}$. Using fast Fourier sampling and the private key, the algorithm derives short polynomials st1 and st2 such that st1+st2H=d modr. One of these polynomials (typically st2) is compressed to form a compact representation y, and the final signature is the tuple (s, y).

The PDC 604 is configured to compute a cryptographic hash over received message fields from the synchronization byte through the checksum field and to verify the digital signature using a FALCON-512 algorithm and the public key extracted from the PMU's X.509 certificate. Authentication of each message occurs only when the digital signature is successfully verified by a validation module.

In some implementations, the PDC 604 may compute the cryptographic hash to the entire message payload, including the header and trailer fields, so the PDC 604 may verify both the integrity and authenticity of the received synchrophasor data. In certain embodiments, the hash may be computed using a secure algorithm, such as SHA-256, SHA-3, or Falcon-512 in a post-quantum variant, and compared against a digital signature of message authentication code provided by the PMU 602. This approach ensures that any modification, truncation, or insertion of bits within the protected range is detectable by the PDC 604. In alternative embodiments, the hash computation may exclude fields subject to change in transit, such as timestamp adjustments, while still covering all critical fields needed for validation of the message structure and the contents.

In some embodiments, the PMU 602 may digitally sign synchrophasor data 622 specifically using the FALCON-512 algorithm, a post quantum digital signature algorithm for authentication. That is, the Falcon-512 algorithm is a lattice-based cryptographic scheme standardized by the National Institute of Standards and Technology (NIST) for digital signatures, providing security against potential attacks by quantum computers. In such embodiments, the PMU 602 uses a private key corresponding to the Falcon-512 key pair to generate a digital signature for each data message. The PDC 604 may verify the signature using the corresponding public key provided in the X.509 certificate of the PMU 602. In alternative embodiments, other digital signature algorithms may be used, including RSA, ECDSA, EdDSA, or other post quantum algorithms such as Dilithium. This approach allows the PMU 602 to authenticate transmitted synchrophasor data 622 and ensure its integrity, even in the presence of intruders capable of performing quantum computing attacks.

Replay attack mitigation is performed contemporaneously with signature verification. The PDC 604 extracts a timestamp value from a second-of-century (SOC) field in a received message and compares the timestamp value to a previously stored value from the same PMU 602 using a timestamp comparator. In one embodiment, the PDC 604 reconstructs the hash d using the salt and message content. It decompresses y to recover st2 and then computes st1=d−st2H modr. The signature is accepted if the Euclidean norm ∥(st1, st2)²∥ does not exceed a defined bound [$\beta^2$], validating both message authenticity and integrity.

The PDC 604 accepts the message upon comparing a SOC value to a previously stored SOC value from the PMU 602. In some embodiments, the PDC 604 may accept the message only if the SOC value is greater than the previously stored value and discards a message if the SOC timestamp is older than or equal to a previously received value from the same PMU 602. When termination of reporting is required, the PDC 604 issues a CMD frame 624 indicating that the PMU 602 may cease (e.g., turn off, stop) transmission of synchrophasor data 622; therefore, the PMU 602 halts transmission. Accordingly, FIG. 6 presents a complete initialization and data-exchange workflow that secures communication between a PMU 602 and a PDC 604 in accordance with IEEE C37.118.2-2024 by receiving, at the PMU 602, a command frame from the PDC 604 requesting an authentication certificate, receiving, at the PMU 602, a configuration frame comprising an X.509 certificate issued by a Certificate Authority, generating, at the PMU 602, a public-private key pair, transmitting, from the PMU 602 to the PDC 604, a configuration frame comprising an X.509 certificate including the public key of the PMU, verifying, at the PMU 602 and at the PDC 604, the authenticity of received X.509 certificates using the trusted Certificate Authority (CA), and transmitting, from the PMU 602 to the PDC 604, synchrophasor data messages digitally signed using the private key of the PMU 602 upon successful mutual authentication. The system depiction further shows a PMU 602 configured to generate digital signatures using a FALCON-512 algorithm, a PDC 604 configured to verify digital signatures using public keys extracted from the X.509 certificate of the PMU 602, a local certificate store at each endpoint for caching trusted certificates, formatting of outgoing data messages to include a security algorithm field and a digital signature field, a timestamp comparator to detect and reject replayed messages based on second-of-century values, and exclusive use of the CFG-4 frame to transmit X.509 certificates with a sync field set to 0x73 for version 3 and a payload field containing the certificate.

Figure 7:
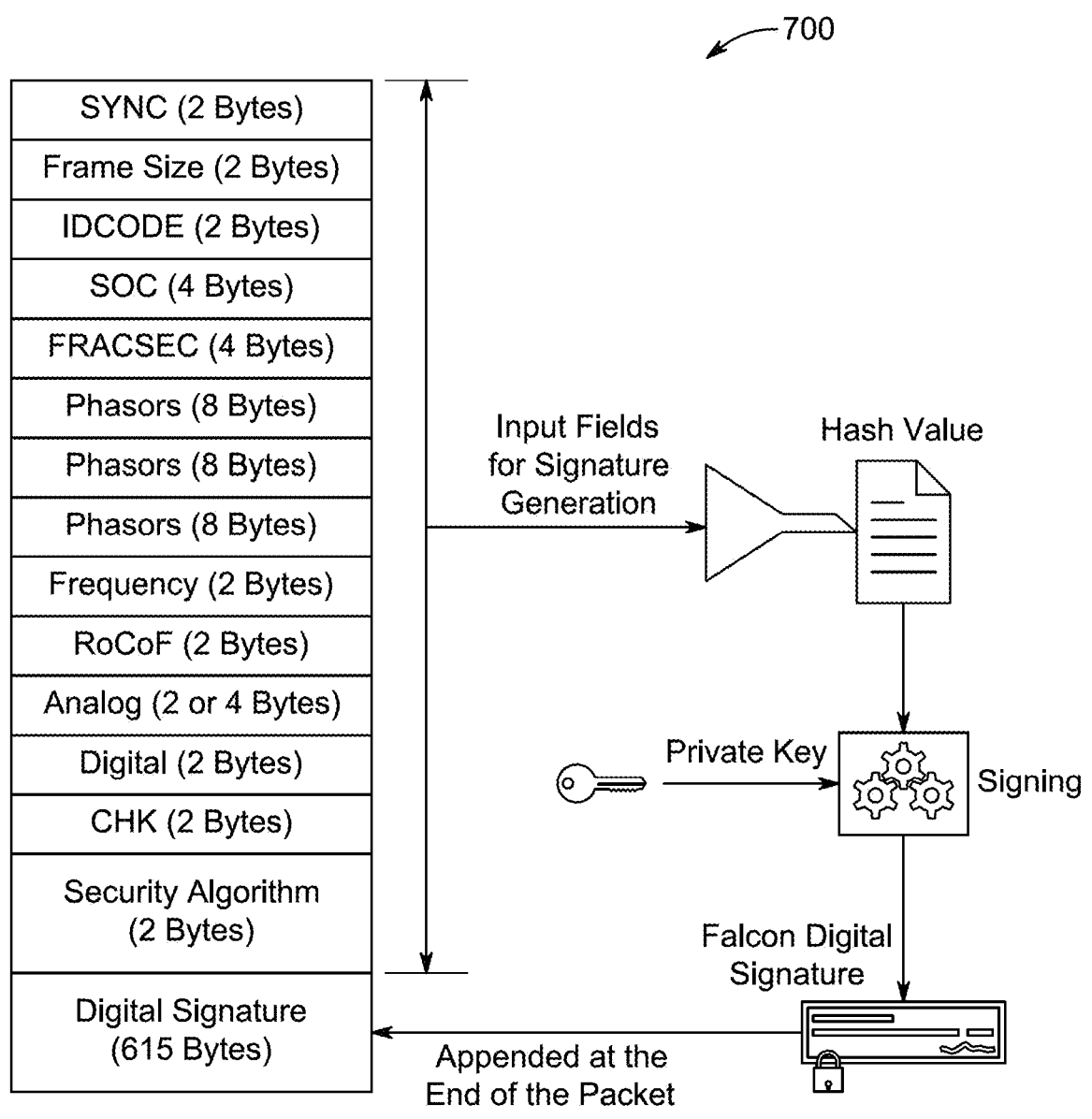
FIG. 7 is an illustration of a proposed secured IEEE C37.118.2 message format, according to certain embodiments.

FIG. 7 illustrates a secured IEEE C37.118.2 message format 700 configured to extend the standard frame without altering any defined fields while enabling per-frame message authentication and message integrity. The left column enumerates the ordered fields that constitute the canonical payload hashed for signature generation, including SYNC of 2 bytes, Frame size of 2 bytes, IDCODE of 2 bytes, SOC of 4 bytes, FRACSEC of 4 bytes, one or more Phasors of 8 bytes each, Frequency of 2 bytes, RoCoF of 2 bytes, Analog of 2 or 4 bytes depending on the selected format, Digital of 2 bytes, and CHK of 2 bytes. Immediately after the CHK field, a Security Algorithm field of 2 bytes is appended, followed by a Digital Signature field appended at the end of the packet, which is depicted as 615 bytes in the figure. The Security Algorithm field values follow Table 3 so that the first byte identifies the encryption algorithm and the second byte identifies the authentication or signature algorithm. A first byte of 0x00 denotes No encryption algorithm, 0x01 denotes AES-128-GCM, and 0x02 denotes AES-256-GCM. For the second byte, 0x00 denotes No authentication value algorithm, 0x01 denotes HMAC-SHA256-128, 0x02 denotes HMAC-SHA256-192, 0x03 denotes HMAC-SHA256-256, 0x04 denotes AES-GMAC-64, 0x05 denotes AES-GMAC-128, and 0x06 denotes FALCON digital signature. The right panel depicts the hash then sign workflow in which a SHA-512 hash is computed over the received fields from SYNC to CHK, the resulting hash value is provided to a signing operation that uses the PMU private key, and a FALCON-512 digital signature is produced and appended after the Security Algorithm field. As only the originating PMU possesses the private signing key, per-frame source authentication and message integrity are ensured. The extension therefore preserves IEEE C37.118.2-2024 field ordering and semantics while enabling explicit, byte-level declaration of the active security algorithm and the attachment of a post-quantum signature. Table 2 summarizes key metrics for Post-Quantum Digital Signature Algorithms.

TABLE 2

Summary of Post-Quantum Digital Signature Algorithms

| Algorithm | Signature Size (bytes) | Public Key Size (bytes) | Description |
|---|---|---|---|
| FALCON-512 | 616 | 897 | Lattice-based, compact, fast |
| CRYSTALS-Dilithium | 2420 | 1472 | Lattice-based, balanced performance |
| SPHINCS+ | 7856 | 32 | Hash-based, highly secure, slow |

TABLE 3

Cryptographic Algorithm Identified by Respective Security Algorithm Field Value

| $1^{st}$ Byte | Description | $2^{nd}$ byte | Description |
|---|---|---|---|
| 0x00 | No encryption algorithm | 0x00 | No authentication value algorithm |
| 0x01 | AES-128-GCM | 0x01 | HMAC-SHA256-128 |
| 0x02 | AES-256-GCM | 0x02 | HMAC-SHA256-192 |
| | | 0x03 | HMAC-SHA256-256 |
| | | 0x04 | AES-GMAC-64 |
| | | 0x05 | AES-GMAC-128 |
| | | 0x06 | FALCON digital signature |

Figure 8:
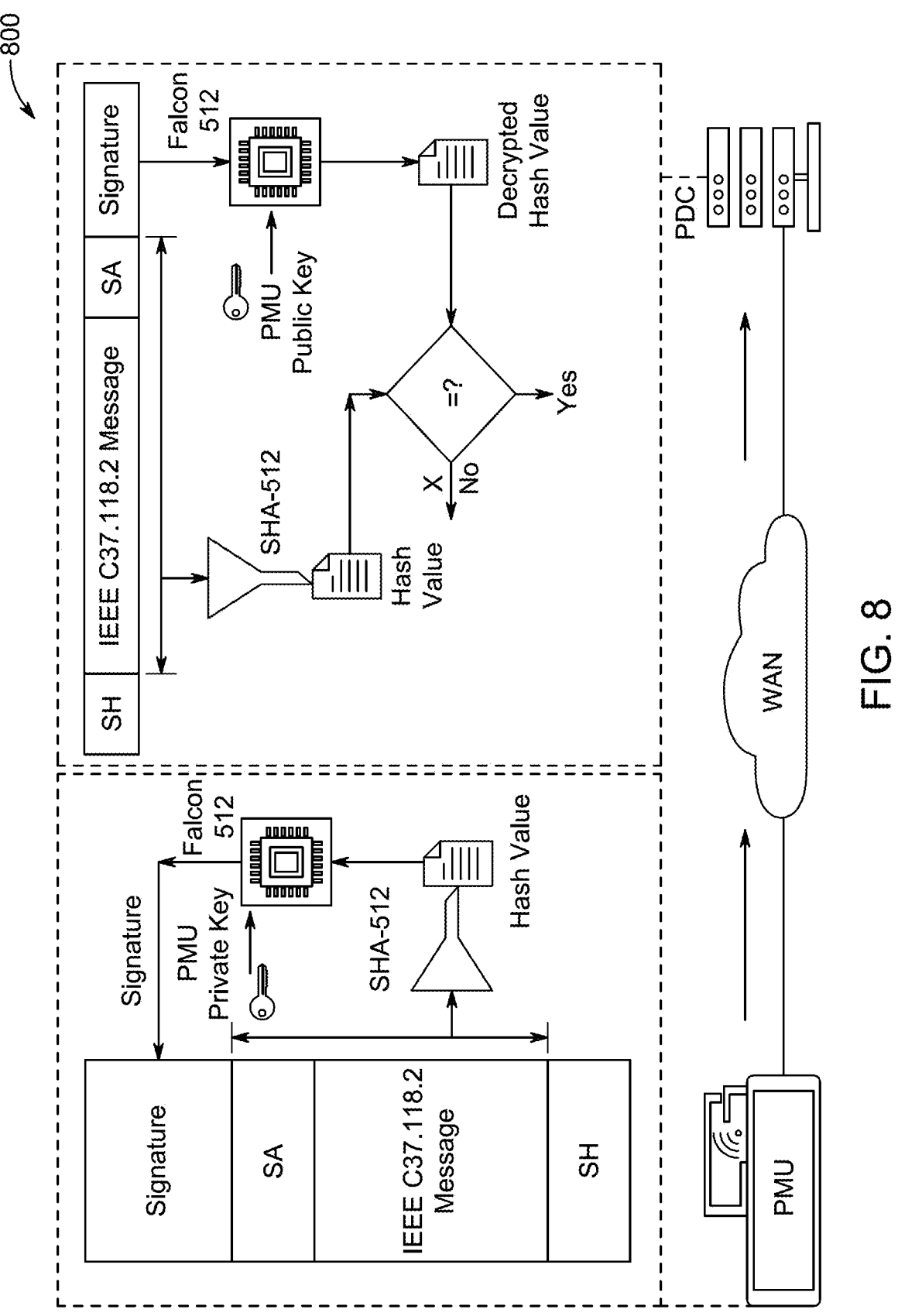
FIG. 8 is an illustration of a FALCON-512 signature verification process at a PMU and a PDC to ensure message integrity and authentication, according to certain embodiments.

FIG. 8 illustrates a FALCON-512 signature verification process 800 performed at a Phasor Measurement Unit (PMU) and a Phasor Data Concentrator (PDC) to ensure message integrity and authentication in accordance with the secure IEEE C37.118.2 communication framework. On the PMU side, the IEEE C37.118.2 message, including the standard protocol fields from SYNC through CHK, is processed through a SHA-512 hashing function to generate a fixed-length hash value. The hash value is then provided to a FALCON-512 signing module along with the private key of the PMU, resulting in the creation of a compact lattice-based digital signature. The signature is appended to the message immediately after the 2-byte Security Algorithm field, which in this implementation has its first byte set to 0x00 to indicate no encryption and its second byte set to 0x06 to indicate the use of the FALCON digital signature algorithm. The signed message is then transmitted over a wide-area network to the PDC.

On the PDC side, the received IEEE C37.118.2 message and Security Algorithm field are processed in a verification sequence. The PDC first applies the SHA-512 function to the received message fields from SYNC through CHK to recompute the hash value. The appended digital signature is then processed through the FALCON-512 verification module using the public key of the PMU, which was obtained from the X.509 certificate of the PMU during the mutual authentication step. The verification module decrypts the signature to recover the original hash value computed by the PMU. A comparison is then performed between the recomputed hash value and the decrypted hash value. If the two match, the message is authenticated and confirmed to be intact, ensuring that it originated from the legitimate PMU and was not altered in transit. If the values do not match, the message fails authentication and is rejected.

The process depicted in FIG. 8 operates in compliance with the IEEE C37.118.2-2024 frame structure, preserving all original fields while appending only the Security Algorithm field and the FALCON-512 digital signature, thereby providing post-quantum-resistant message authentication and integrity assurance without altering the standard protocol format.

Figure 9:
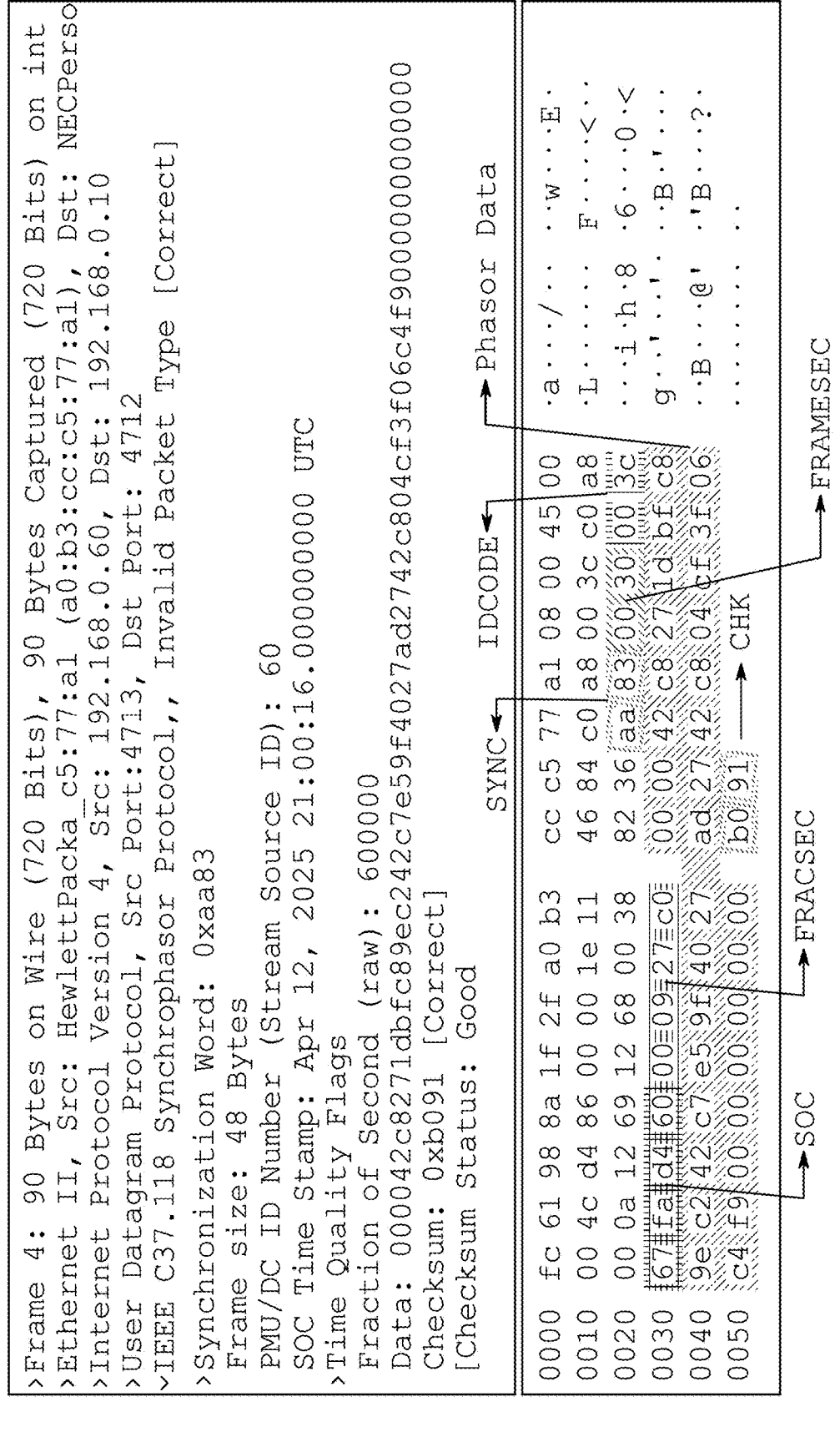
FIG. 9 is an illustration of a Wireshark packet capture of an IEEE C37.118.2 PMU data message, according to certain embodiments.

FIG. 9 illustrates a Wireshark packet capture of a typical IEEE C37.118.2 PMU data message generated by the developed S-PMU-Falcon framework in accordance with the IEEE C37.118.2-2024 standard. The message is transmitted over UDP/IP and encapsulated within an Ethernet II frame. The capture shows a total frame length of 90 bytes on the wire, including 48 bytes of PMU payload. The decoded packet content identifies the Synchronization word 0xaa83, a Framesize field set to 48 bytes, a PMU/DC ID number of 60, and an SOC timestamp of Apr. 12, 2025, 21:00: 16.000000000 UTC. Time quality flags are present, and the Fraction of second field is populated with a raw value of 600000. The phasor data region contains 24 bytes in polar format, followed by the checksum field with a value of 0xb091, indicated as correct with a good checksum status. The lower portion of the capture visually maps the SOC, FRACSEC, SYNC, FRAMESIZE, IDCODE, phasor data, and CHK fields to their corresponding byte positions within the raw packet data.

FIG. 10 illustrates a Wireshark packet capture of a CFG-4 configuration frame transmitted by a PMU containing its X.509 certificate as part of the mutual authentication process. The capture shows the Synchronization word set to 0xaa73, with the upper nibble 0111 indicating the CFG-4 frame type and the lower nibble 0011 indicating Version 3 of the protocol. The Framesize is set to 1046 bytes, the PMU/DC ID number is 60, and the SOC timestamp is Apr. 12, 2025, 21:01:04.000000000 UTC. The payload field contains the PMU's X.509 certificate issued by a trusted Certificate Authority and bound to the PMU's public key. The inclusion of the certificate enables cryptographic node authentication, ensuring that only authorized devices participate in synchrophasor data exchange.

FIG. 11 illustrates a Wireshark packet capture of a FALCON-secured IEEE C37.118.2 data message. The packet structure retains the IEEE C37.118.2-2024 fields from SYNC through CHK without modification and appends a 2-byte Security Algorithm field immediately after the CHK field, followed by the FALCON-512 digital signature field. In the depicted capture, the Security Algorithm field is set to 0x0006, with the first byte 0x00 indicating no encryption and the second byte 0x06 specifying the use of the FALCON digital signature algorithm. The appended digital signature is generated by computing a SHA-512 hash over the fields from SYNC through CHK and signing the hash using the PMU's private key. The PDC, using the PMU's public key from its X.509 certificate, verifies the signature to confirm message integrity and authenticity.

In one aspect of the present disclosure, the signature computation times for signature generation and signature verification is computed for various platforms as demonstrated by Table 4. It is evident that the FALCON signature operations are lightweight enough to support high-frequency PMU data reporting. Even on a resource-constrained platform, the maximum observed signing time remained under 2 milliseconds, which is well within the typical delay ranges for PMU and PDC processing as shown in Table 5.

17

TABLE 4

Falcon-512 Signature Computation Times

| | Computational Delays in ms | | | | | |
| | Signature Generation | | | Signature Verification | | |
| Platform | Avg. | Max. | SD | Avg. | Max. | SD |
|---|---|---|---|---|---|---|
| Quad Core Cortex A72 | 0.705 | 1.142 | 0.112 | 0.154 | 0.246 | 0.044 |
| Core i5 | 0.57 | 0.722 | 0.034 | 0.107 | 0.167 | 0.015 |

TABLE 5

Typical PMU Communication Delays and Their Sources

| Delay Source | Delay range (ms) |
|---|---|
| PMU internal processing | 0.005-30 |
| Processing at the PDC | 2-2000 |
| Serialization delay | 0.05-20 |
| I/O delays within communication systems | 0.05-30 |
| Communication transmission (500 miles) | 3-5 |
| Network buffering and error corrections | 0.05-5 |

Figure 12:
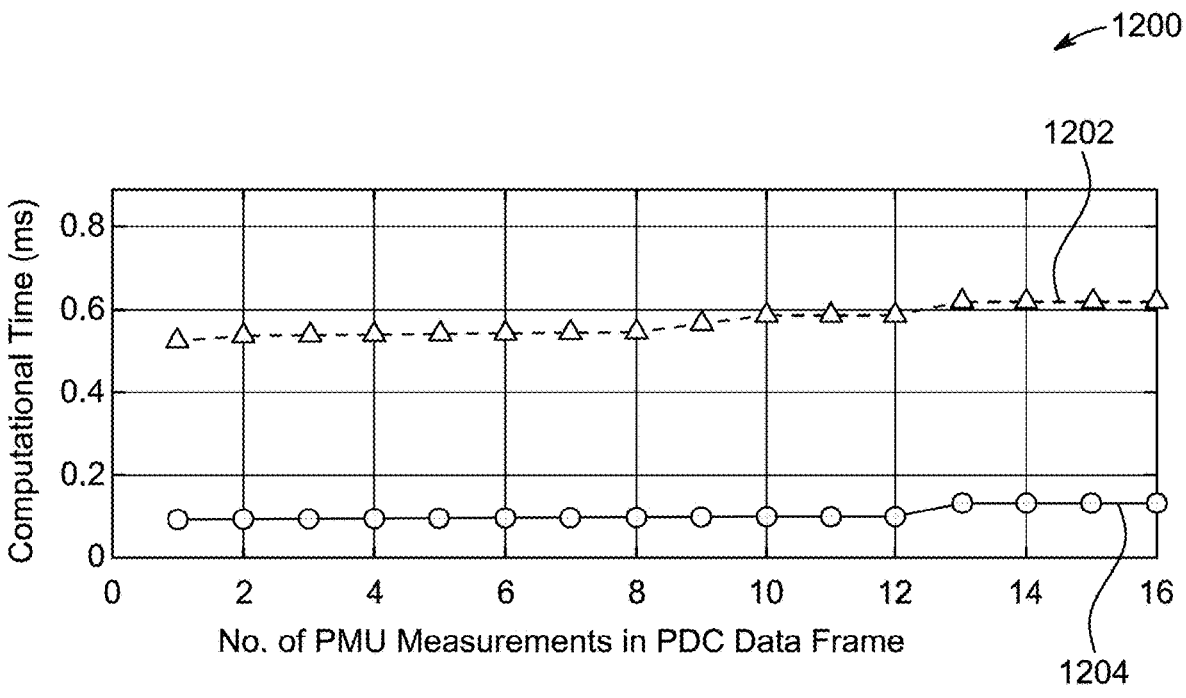
FIG. 12 is a chart illustrating FALCON-512 signature generation and verification times for a PDC data frame with varying numbers of aggregated PMU measurements, according to certain embodiments.
Figure 13:
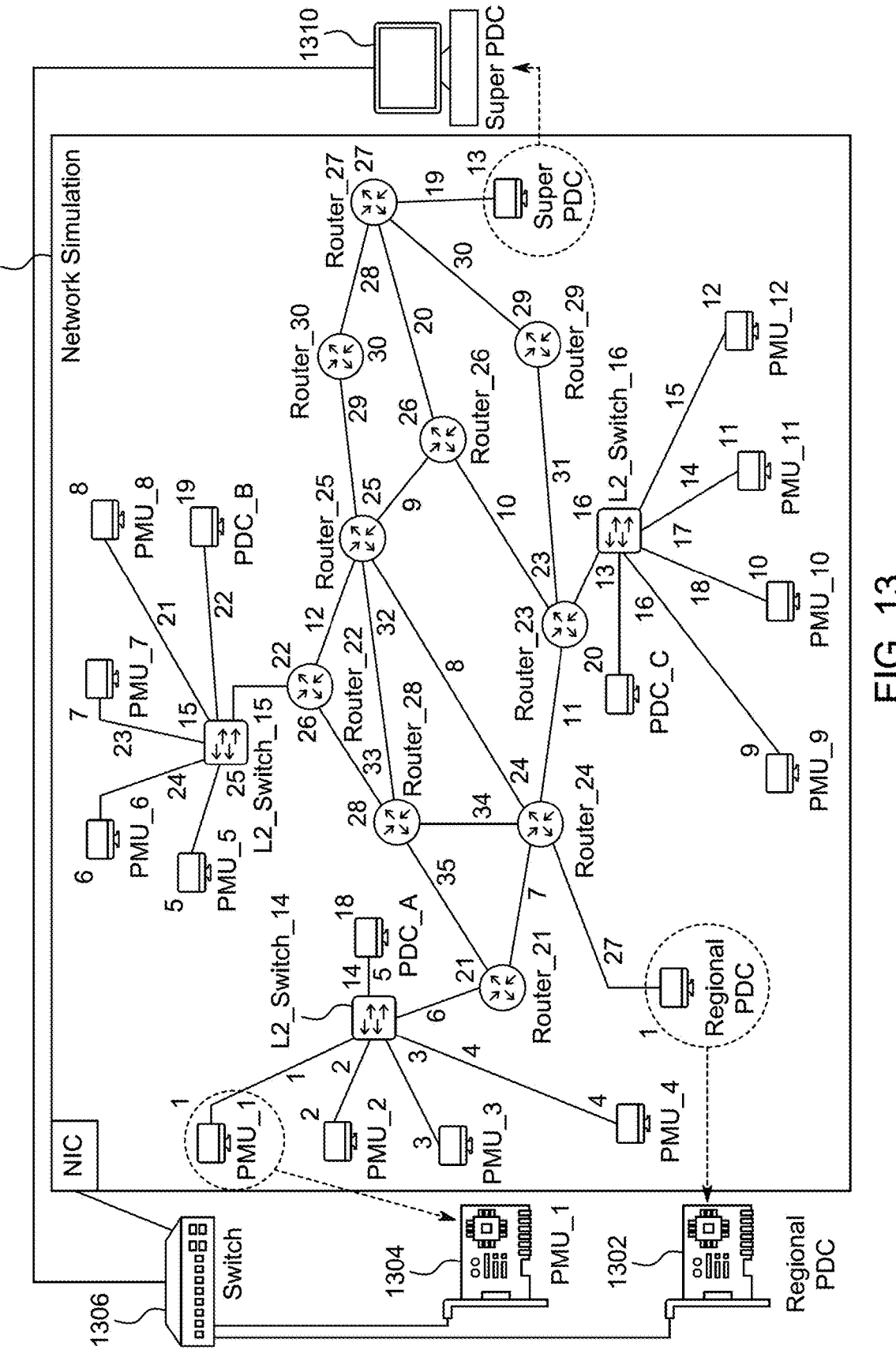
FIG. 13 is an illustration of an experimental emulation platform set up for performance evaluation of secure IEEE C37.118.2 communication, according to certain embodiments.

FIG. 12 illustrates the measured FALCON-512 signature generation and verification times for PDC data frames containing varying numbers of aggregated PMU measurements, supporting claims 14 through 16. The horizontal axis represents the number of PMU measurements in the PDC data frame, ranging from 1 to 16, while the vertical axis represents computational time in milliseconds. The upper series of data points corresponds to signature generation times, and the lower series corresponds to signature verification times. Results show that both signing and verification times remain nearly constant regardless of the number of PMU measurements, reflecting the fixed-size input property of the hash-then-sign paradigm. On an Intel Core i5 platform, average signature generation time is well below 1 ms and verification time is under 0.5 ms, introducing negligible delay relative to typical PDC processing latencies. FIG. 13 illustrates the experimental emulation platform used to evaluate end-to-end communication delays in accordance with the secure IEEE C37.118.2 messaging described in the claims. The setup integrates the NetSim network simulation tool with the developed S-PMU-Falcon framework in an emulation mode. Physical terminals running PMU and PDC simulators are bound to specific network nodes within the NetSim topology. The depicted topology includes multiple PMUs 1304 connected via a switch 1306 and routers in a simulated wide-area network 1308 to regional PDCs 1302 and a Super PDC 1310. Both SONET-based and 5G-based WAN scenarios are modeled, with background traffic generated according to a Pareto distribution to emulate realistic operational conditions. This setup enables accurate measurement of end-to-end delays for both normal and FALCON-secured IEEE C37.118.2 messages under representative communication conditions, validating that security enhancements do not violate real-time synchrophasor application requirements.

To comprehensively assess the impact of the increased message size resulting from the appended digital signature on end-to-end (ETE) communication delays, a detailed emulation platform integrating the NetSim network simulation tool and the developed PMU/PDC software framework ("S-PMU-Falcon") is employed, as depicted in FIG. 13. The emulation setup involves mapping terminal devices executing the developed S-PMU-Falcon framework to corresponding network nodes within NetSim. Specifically, terminals configured as PMU and PDC simulators execute the framework to generate realistic IEEE C37.118.2 traffic. These terminals are bound to specific nodes within NetSim by configuring them in "emulation mode" and setting appropriate routing tables. As a result, PMU traffic originating from the physical terminals seamlessly enters the simulated network environment, traverses network routers, and experiences realistic network delays, thereby enabling accurate measurement of ETE communication delays.

For the evaluation, an example topology consisting of twelve PMUs geographically distributed over an area of 250 km×250 km is simulated, with interconnection through regional and central PDCs. Each PMU and PDC is configured to transmit messages at a rate of 120 frames per second. Two widely adopted wide-area network (WAN) communication technologies, Synchronous Optical Networking (SONET) and 5G cellular communication, are examined. The SONET simulation employs routers interconnected via OC-3 (155 Mbps) and OC-48 (2.5 Gbps) links, with PMUs connected through 1 Gbps Ethernet interfaces. In the 5G scenario, PMUs are represented as User Equipment (UE) nodes connected through a Radio Access Network (RAN) with a 20 MHz bandwidth, utilizing 64-QAM modulation and multiple-input multiple-output (MIMO) antennas. The 5G core network is implemented with fiber connections offering 10 Gbps capacity and approximately 5 ms average latency.

To emulate realistic network conditions, background traffic is introduced into the simulation. The background traffic is modeled as a stochastic process following a Pareto distribution, accurately reflecting the fractal and self-similar characteristics of real network traffic patterns. This background traffic is simulated between all PMU nodes and the central PDC to replicate realistic operational conditions.

Table 6 provides a detailed comparison of ETE delays for normal and FALCON-secured IEEE C37.118.2 messages under the evaluated communication technologies. Despite the message size increase from 94 bytes to 711 bytes due to the inclusion of the FALCON digital signature, the observed ETE delays remain well below the maximum allowable ranges for critical PMU applications, as reported in Table 7. Notably, the highest recorded ETE delay, approximately 6 ms under SONET OC-3, satisfies even the most stringent delay requirements. Furthermore, in a PDC-to-PDC communication scenario, such as a data frame containing synchrophasor measurements from four PMUs, the ETE delay was measured at approximately 16 ms over a typical WAN link (155 Mbps OC-3). These results demonstrate that even significantly larger FALCON-signed frames, as generated through PDC-level data concentration, do not compromise the real-time operational requirements of the system.

TABLE 6

ETE Delay Comparison of FALCON Secured PMU Messages

| Message Type | Message size | Computational Delay (ms) | Communication Technology | Communication delay (ms) | ETE delays (ms) |
|---|---|---|---|---|---|
| PMU Plain | — | — | SONET OC-3 | 0.63 | 0.63 |
| | 90 | | SONET OC-48 | 0.38 | 0.38 |
| | | | 5G | 0.51 | 0.51 |
| PMU | 711 | 0.859 | SONET OC-3 | 4.40 | 5.259 |

TABLE 6-continued

ETE Delay Comparison of FALCON Secured PMU Messages

| Message Type | Message size | Computational Delay (ms) | Communication Technology | Communication delay (ms) | ETE delays (ms) |
|---|---|---|---|---|---|
| FALCON | | | SONET OC-48 | 3.34 | 4.199 |
| | | | 5G | 4.21 | 5.069 |
| PDC Plain | 240 | — | SONET OC-3 | 11.39 | 11.39 |
| | | | SONET OC-48 | 10.84 | 10.84 |
| | | | 5G | 11.11 | 11.11 |
| PDC FALCON | 861 | 0.895 | SONET OC-3 | 15.06 | 15.955 |
| | | | SONET OC-48 | 13.34 | 14.235 |
| | | | 5G | 14.21 | 15.105 |

TABLE 7

ETE delay Requirements of Various PMU Applications

| PMU data application | Message rate (/s) | ETE delay (ms) |
|---|---|---|
| State estimation | ≥10 | 500 |
| Under-voltage load shedding | ≥25 | 50 |
| Sync-check operations | ≥4 | 100 |
| Wide-area control schemes | ≥10 | 50-500 |
| Adaptive protection | ≥10 | 50 |
| Out-of-step protection | ≥10 | 50-500 |

The IEEE C37.118.2 standard, notwithstanding its extensive adoption for synchrophasor data communications, presently lacks intrinsic cybersecurity mechanisms, thereby rendering PMU networks susceptible to evolving cyber threats, including those enabled by quantum computing. To address this critical deficiency, the present disclosure described through FIGS. 1 to 14 introduces a quantum-resistant security framework that integrates the FALCON-512 digital signature scheme into IEEE C37.118.2 messages. By means of the developed "S-PMU-Falcon" framework, the disclosed scheme ensures robust message integrity and node authentication while imposing minimal impact on existing communication structures. Comprehensive experimental evaluations conducted on low-computing-power platforms, in conjunction with realistic wide-area network (WAN)-based network emulation scenarios, demonstrate that the computational and communication overhead introduced by the proposed scheme remains well within the stringent latency constraints of real-time PMU applications, including but not limited to state estimation, adaptive protection, and under-frequency load shedding. Accordingly, the present work materially enhances the security posture of IEEE C37.118.2 communications against both current and emerging quantum-enabled cyber threats. Future work contemplates the integration of data confidentiality mechanisms employing encryption algorithms and the exploration of additional cybersecurity measures specifically configured to mitigate denial-of-service (DoS) attacks, thereby further augmenting the security resilience of synchrophasor communication networks.

Figure 14:
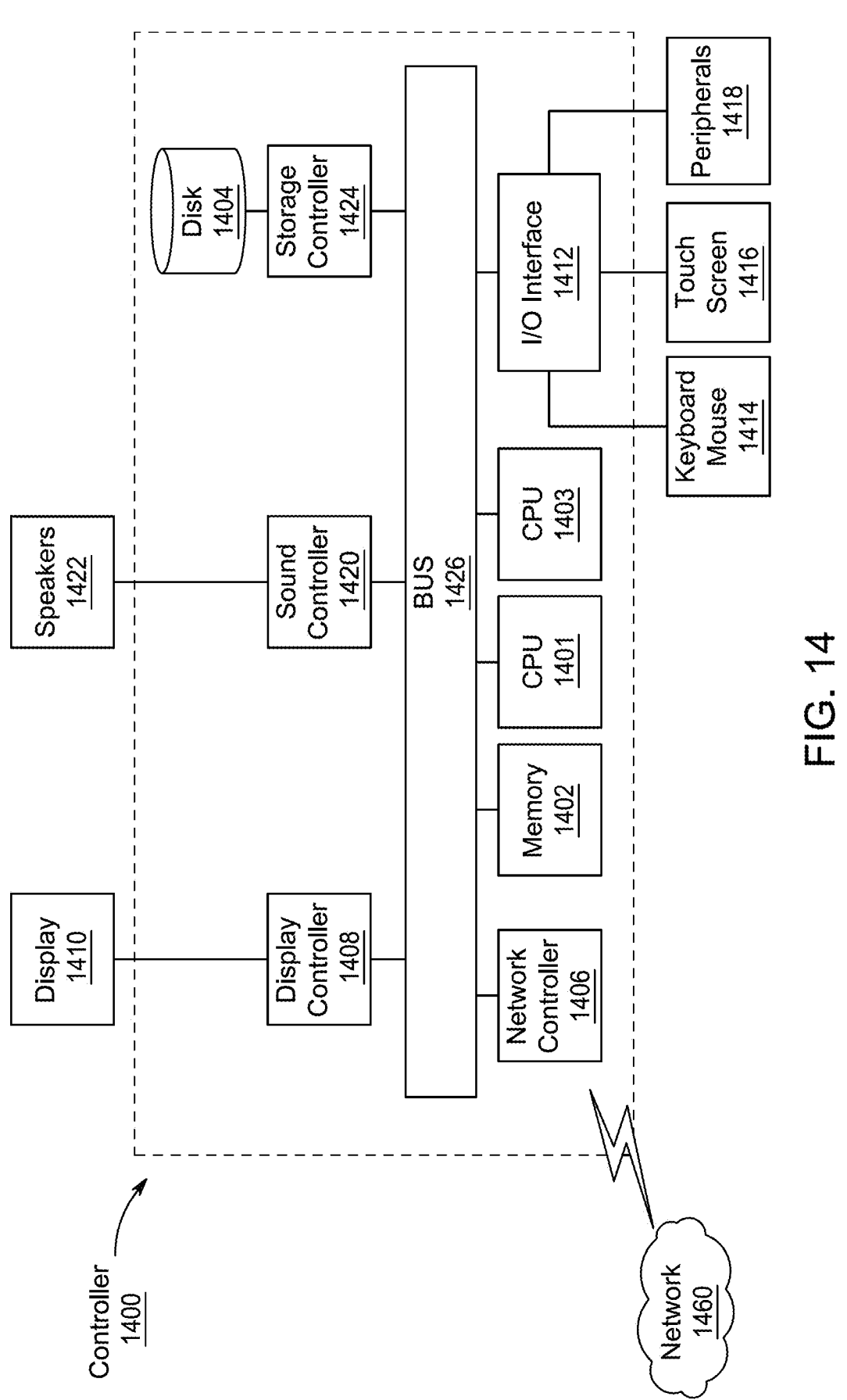
FIG. 14 is an illustration of a non-limiting example of details of computing hardware used in the computing system, according to certain embodiments.

Next, further details of the hardware description of the computing environment according to exemplary embodiments is described with reference to FIG. 14. In FIG. 14, a controller 1400 is described is representative of the network 100 of FIG. 1 in which the controller is a computing device which includes a CPU 1401 which performs the processes described above/below. The process data and instructions may be stored in memory 1402. These processes and instructions may also be stored on a storage medium disk 1404 such as a hard drive (HDD) or portable storage medium or may be stored remotely.

Further, the present disclosure is not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the present disclosure may be provided as a utility application, background daemon, or component of an operating system, or combination thereof, executing in conjunction with CPU 1401, 1403 and an operating system such as Microsoft Windows 7, Microsoft Windows 10, UNIX, LINUX, Apple MAC-OS and other systems known to those skilled in the art.

The hardware elements in order to achieve the computing device may be realized by various circuitry elements, known to those skilled in the art. For example, CPU 1401 or CPU 1403 may be a Xenon or Core processor from Intel of America or an Opteron processor from AMD of America, or may be other processor types that would be recognized by one of ordinary skill in the art. Alternatively, the CPU 1401, 1403 may be implemented on an FPGA, ASIC, PLD or using discrete logic circuits, as one of ordinary skill in the art would recognize. Further, CPU 1401, 1403 may be implemented as multiple processors cooperatively working in parallel to perform the instructions of the inventive processes described above.

The computing device in FIG. 14 also includes a network controller 1406, such as an Intel Ethernet PRO network interface card from Intel Corporation of America, for interfacing with network 1460. As can be appreciated, the network 1460 can be a public network, such as the Internet, or a private network such as an LAN or WAN network, or any combination thereof and can also include PSTN or ISDN sub-networks. The network 1460 can also be wired, such as an Ethernet network, or can be wireless such as a cellular network including EDGE, 3G, 4G, and 5G wireless cellular systems. The wireless network can also be WiFi, Bluetooth, or any other wireless form of communication that is known.

The computing device further includes a display controller 1408, such as a NVIDIA Geforce GTX or Quadro graphics adaptor from NVIDIA Corporation of America for interfacing with display 1410, such as a Hewlett Packard HPL2445w LCD monitor. A general purpose I/O interface 1412 interfaces with a keyboard and/or mouse 1414 as well as a touch screen panel 1416 on or separate from display 1410. General purpose I/O interface also connects to a variety of peripherals 1418 including printers and scanners, such as an OfficeJet or DeskJet from Hewlett Packard.

A sound controller 1420 is also provided in the computing device such as Sound Blaster X-Fi Titanium from Creative, to interface with speakers/microphone 1422 thereby providing sounds and/or music.

The general purpose storage controller 1424 connects the storage medium disk 1404 with communication bus 1426, which may be an ISA, EISA, VESA, PCI, or similar, for interconnecting all of the components of the computing device. A description of the general features and functionality of the display 1410, keyboard and/or mouse 1414, as well as the display controller 1408, storage controller 1424, network controller 1406, sound controller 1420, and general purpose I/O interface 1412 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 15.

Figure 15:
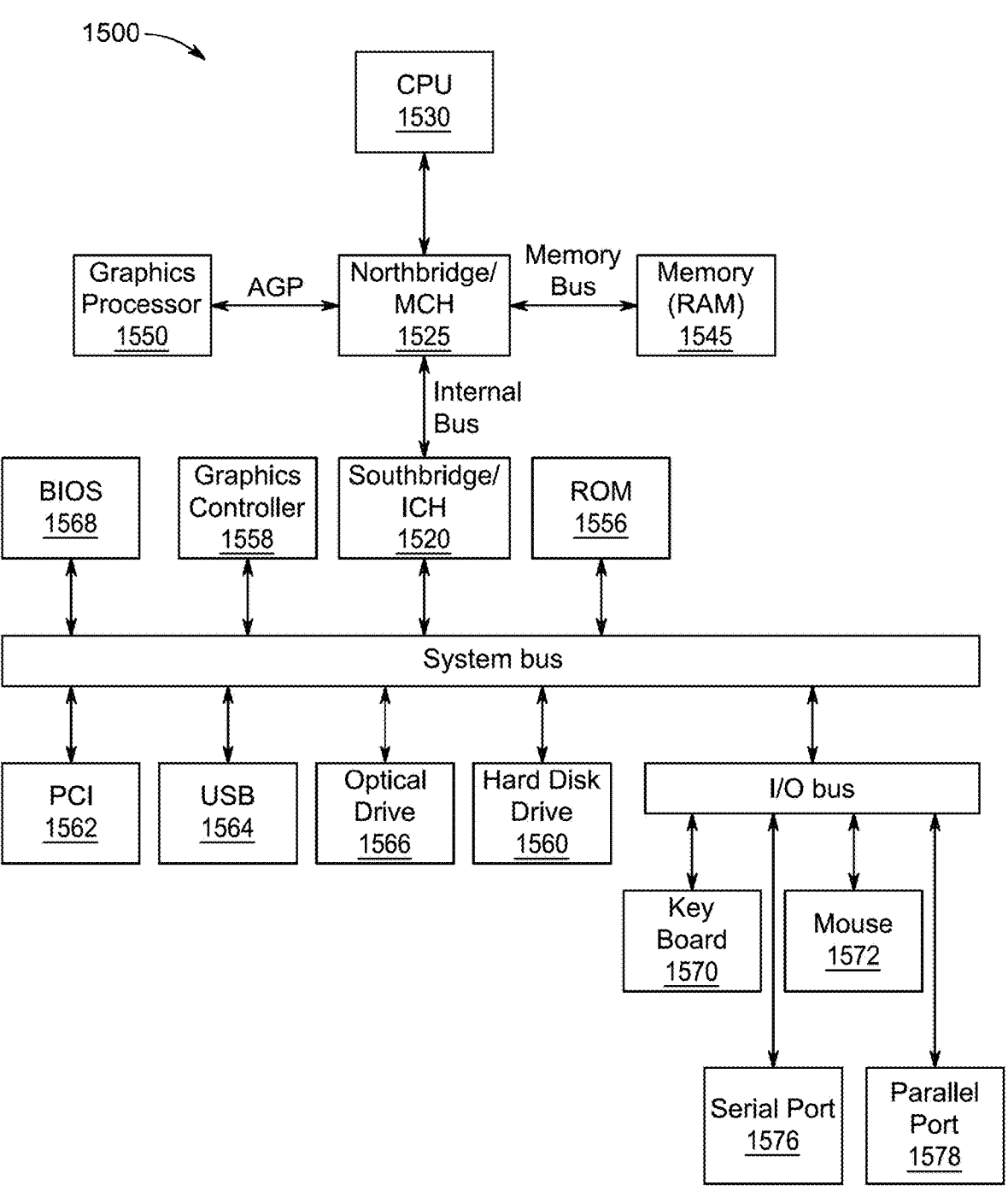
FIG. 15 is an exemplary schematic diagram of a data processing system used within the computing system, according to certain embodiments.

FIG. 15 shows a schematic diagram of a data processing system, according to certain embodiments, for performing the functions of the exemplary embodiments. The data processing system is an example of a computer in which code or instructions implementing the processes of the illustrative embodiments may be located.

In FIG. 15, data processing system 1500 employs a hub architecture including a north bridge and memory controller hub (NB/MCH) 1525 and a south bridge and input/output (I/O) controller hub (SB/ICH) 1520. The central processing unit (CPU) 1530 is connected to NB/MCH 1525. The NB/MCH 1525 also connects to the memory 1545 via a memory bus, and connects to the graphics processor 1550 via an accelerated graphics port (AGP). The NB/MCH 1525 also connects to the SB/ICH 1520 via an internal bus (e.g., a unified media interface or a direct media interface). The CPU Processing unit 1530 may contain one or more processors and even may be implemented using one or more heterogeneous processor systems.

Figure 16:
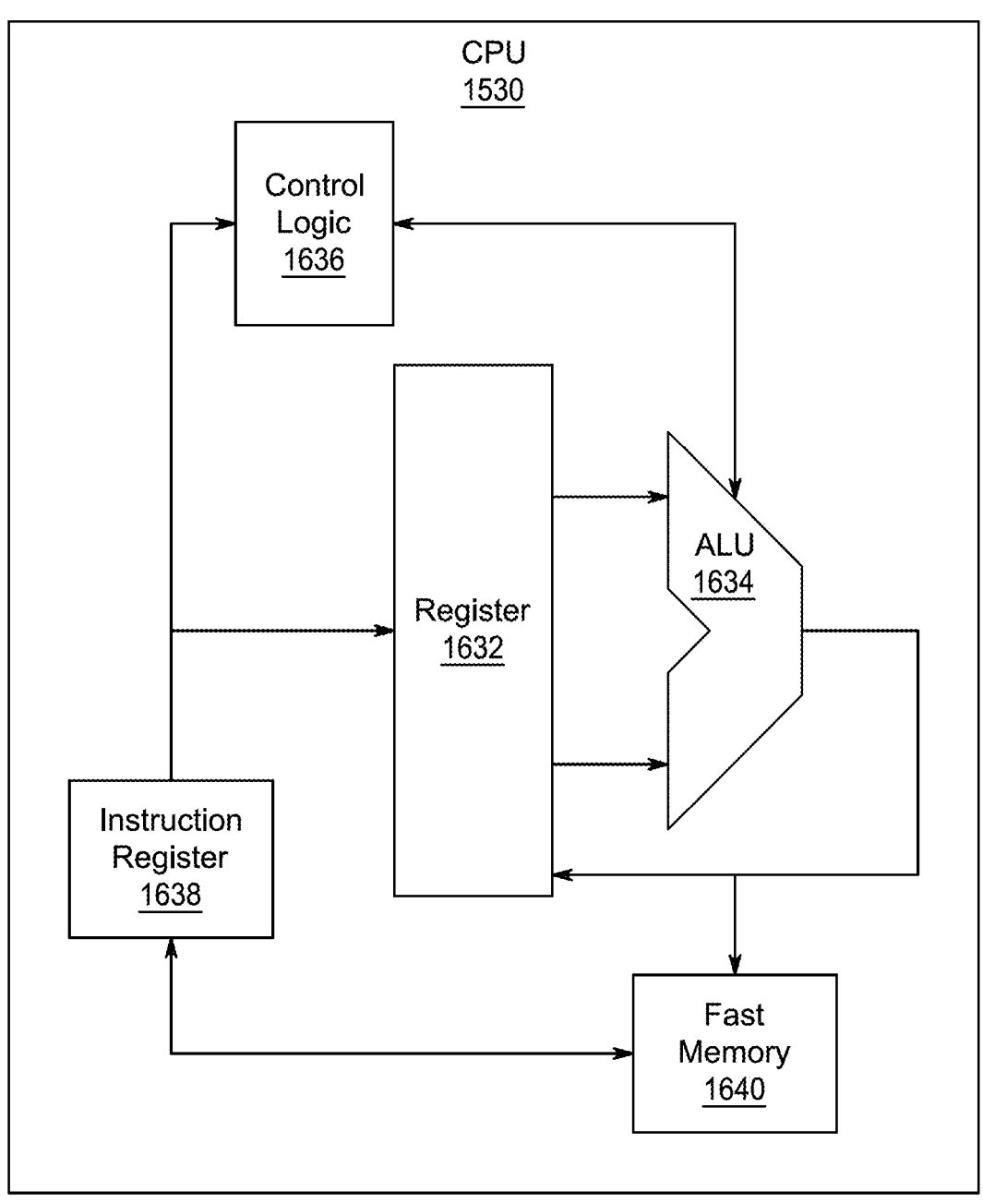
FIG. 16 is an exemplary schematic diagram of a processor used with the computing system, according to certain embodiments.

For example, FIG. 16 shows one implementation of CPU 1530. In one implementation, the instruction register 1638 retrieves instructions from the fast memory 1640. At least part of these instructions is fetched from the instruction register 1638 by the control logic 1636 and interpreted according to the instruction set architecture of the CPU 1530. Part of the instructions can also be directed to the register 1632. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 1634 that loads values from the register 1632 and performs logical and mathematical operations on the loaded values according to the instructions. The results from these operations can be feedback into the register and/or stored in the fast memory 1640. According to certain implementations, the instruction set architecture of the CPU 1530 can use a reduced instruction set architecture, a complex instruction set architecture, a vector processor architecture, a very large instruction word architecture. Furthermore, the CPU 1530 can be based on the Von Neuman model or the Harvard model. The CPU 1530 can be a digital signal processor, an FPGA, an ASIC, a PLA, a PLD, or a CPLD. Further, the CPU 1530 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 15, the data processing system 1500 can include that the SB/ICH 1520 is coupled through a system bus to an I/O Bus, a read only memory (ROM) 1556, universal serial bus (USB) port 1564, a flash binary input/output system (BIOS) 1568, and a graphics controller 1558. PCI/PCIe devices can also be coupled to SB/ICH 1588 through a PCI bus 1562.

The PCI devices may include, for example, Ethernet adapters, add-in cards, and PC cards for notebook computers. The Hard disk drive 1560 and CD-ROM 1566 can use, for example, an integrated drive electronics (IDE) or serial advanced technology attachment (SATA) interface. In one implementation the I/O bus can include a super I/O (SIO) device.

Further, the hard disk drive (HDD) 1560 and optical drive 1566 can also be coupled to the SB/ICH 1520 through a system bus. In one implementation, a keyboard 1570, a mouse 1572, a parallel port 1578, and a serial port 1576 can be connected to the system bus through the I/O bus. Other peripherals and devices that can be connected to the SB/ICH 1520 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 17:
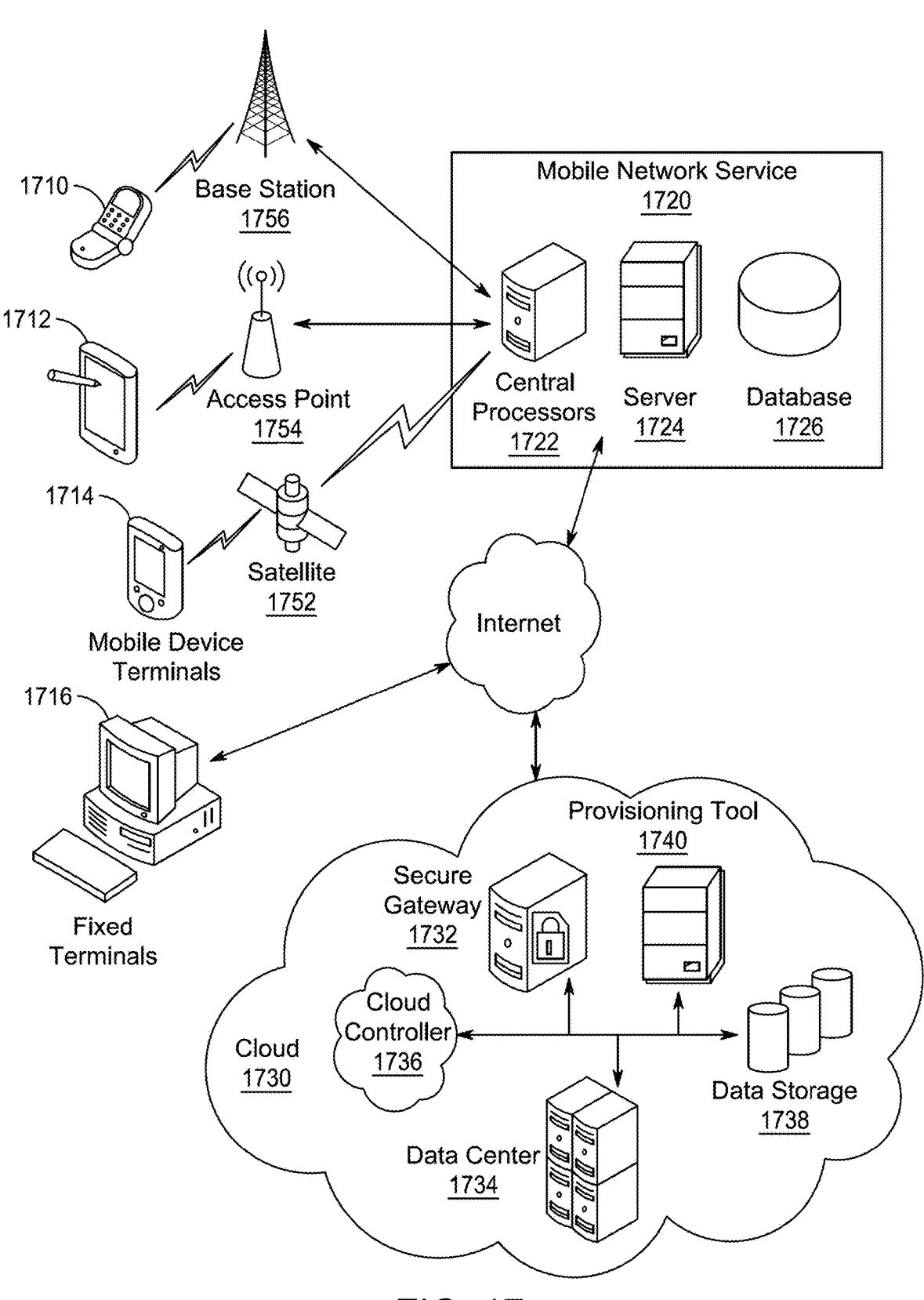
FIG. 17 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 17, in addition to various human interface and communication devices (e.g., display monitors, smart phones, tablets, personal digital assistants (PDAs)). More specifically, FIG. 17 illustrates client devices including a smart phone 1711, a tablet 1712, a mobile device terminal 1714 and fixed terminals 1716. These client devices may be commutatively coupled with a mobile network service 1720 via a base station 1756, an access point 1754, a satellite 1752 or via an internet connection. The mobile network service 1720 may comprise central processors 1722, a server 1724 and a database 1726. The fixed terminals 1716 and the mobile network service 1720 may be commutatively coupled via an internet connection to functions in cloud 1730 that may comprise a security gateway 1732, a data center 1734, a cloud controller 1736, a data storage 1738 and a provisioning tool 1740. The network may be a private network, such as the LAN or the WAN, or may be the public network, such as the Internet. Input to the system may be received via direct user input and received remotely either in real-time or as a batch process. Additionally, some implementations may be performed on modules or hardware not identical to those described. Accordingly, other implementations are within the scope that may be disclosed.

The above-described hardware description is a non-limiting example of corresponding structure for performing the functionality described herein.

Numerous modifications and variations of the present disclosure are possible in light of the above teachings. It is therefore to be understood that the invention may be practiced otherwise than as specifically described herein.

The invention claimed is:

1. A method for securing communication between a Phasor Measurement Unit (PMU) and a Phasor Data Concentrator (PDC) in accordance with IEEE C37.118.2-2024, the method comprising:

receiving, at the PMU, a command frame from the PDC requesting authentication;

receiving, at the PMU, a configuration frame comprising an X.509 certificate issued by a Certificate Authority (CA), the X.509 certificate including a public key of the PDC;

verifying, at the PMU, the authenticity of the X.509 certificate received from the PDC using a trusted CA;

generating, at the PMU, a public-private key pair of the PMU, the public-private key pair comprising a public key of the PMU and a private key of the PMU;

transmitting, from the PMU to the PDC, a configuration frame comprising an X.509 certificate issued by the trusted CA, the X.509 certificate including the public key of the PMU;

verifying, at the PDC, the authenticity of the X.509 certificate received from the PMU using the trusted CA; and transmitting, from the PMU to the PDC, synchrophasor data messages digitally signed using the private key of the PMU, upon successful mutual authentication.

2. The method of claim 1, wherein the synchrophasor data message comprises:

a message payload formatted in accordance with IEEE C37.118.2-2024;

a checksum field;

a security algorithm field appended after the checksum field, wherein the security algorithm field comprises two bytes, a first byte indicating absence of encryption and a second byte indicating the use of a digital signature algorithm; and a digital signature appended after the security algorithm field, wherein the digital signature is generated by applying a FALCON-512 algorithm to a SHA-512 hash of message fields extending from a synchronization byte through the checksum field.

3. The method of claim 1, further comprising:

extracting, at the PDC, a timestamp value from a second-of-century (SOC) field in a received message;

comparing the SOC value to a previously stored SOC value from the same PMU; and accepting the message only if the SOC value is greater than the previously stored value.

4. The method of claim 2, further comprising:

computing, at the PDC, a cryptographic hash over received message fields from the synchronization byte through the checksum field;

verifying the digital signature using a FALCON-512 algorithm and the public key obtained from the X.509 certificate from the PMU; and authenticating the message only when the digital signature is successfully verified.

5. The method of claim 1, wherein the X.509 certificate from the PMU is transmitted in a CFG-4 configuration frame, wherein the CFG-4 configuration frame further comprises:

a sync field with a second byte set to 0x73, indicating a frame type of CFG-4 and protocol version 3 under IEEE C37.118.2-2024; and a payload field containing the X.509 certificate.

6. The method of claim 1, wherein the configuration frame received from the PDC comprises a sync field formatted in accordance with IEEE C37.118.2-2024 and a payload field containing the X.509 certificate.

7. The method of claim 1, wherein the command frame includes a CMD field set to a user-defined value indicating a certificate request.

8. The method of claim 1, wherein failure to verify either X.509 certificate causes the PMU or PDC to terminate a communication session.

9. The method of claim 1, further comprising storing, at the PMU, the public key and certificate of the PDC for reuse in future sessions.

10. The method of claim 1, wherein each of the PMU and PDC renews its X.509 certificate after a defined time period.

11. The method of claim 1, wherein the PMU generates its public-private key pair using lattice-based cryptographic primitives.

12. The method of claim 3, wherein the PDC is configured to discard a message if the SOC timestamp is older than or equal to a previously received value from the same PMU.

13. The method of claim 2, wherein the digital signature is appended after the checksum field without modifying the original IEEE C37.118.2 frame structure.

14. A system for secure transmission of synchrophasor data, comprising:

a PMU configured to:

generate a public-private key pair, receive a configuration frame including a X.509 certificate from a PDC, verify the certificate via a Certificate Authority (CA), transmit a X.509 certificate from the PMU, and transmit digitally signed synchrophasor messages;

a PDC configured to:

send a command frame requesting the X.509 certificate from the PMU, transmit a X.509 certificate from the PDC, receive the X.509 certificate from the PMU, verify the received PMU certificate via the CA, and authenticate signed messages using the public key from the PMU.

15. The system of claim 14, wherein the PMU comprises a cryptographic module configured to generate digital signatures using a FALCON-512 algorithm.

16. The system of claim 14, wherein the PDC comprises a validation module configured to verify digital signatures using public keys extracted from the PMU's X.509 certificate.

17. The system of claim 14, wherein the PMU and PDC each comprise a local certificate store for caching trusted certificates.

18. The system of claim 14, wherein the PMU formats each outgoing data message to include a security algorithm field and a digital signature field.

19. The system of claim 14, wherein the PDC includes a timestamp comparator to detect and reject replayed synchrophasor messages based on SOC values.

20. The system of claim 14, wherein a CFG-4 frame is used exclusively to transmit X.509 certificates and includes a sync field and a payload field.

* * * * *